US009225001B2

(12) United States Patent
Hattori et al.

(10) Patent No.: US 9,225,001 B2
(45) Date of Patent: Dec. 29, 2015

(54) PRISMATIC SECONDARY BATTERY

(71) Applicant: Sanyo Electric Co., Ltd., Moriguchi, Osaka (JP)

(72) Inventors: Takayuki Hattori, Moriguchi, Osaka (JP); Hiroshi Hosokawa, Moriguchi, Osaka (JP); Yasuhiro Yamauchi, Moriguchi, Osaka (JP)

(73) Assignee: SANYO Electric Co., Ltd., Moriguchi-shi (JP)

( * ) Notice: Subject to any disclaimer, the term of this patent is extended or adjusted under 35 U.S.C. 154(b) by 171 days.

(21) Appl. No.: 13/770,019

(22) Filed: Feb. 19, 2013

(65) Prior Publication Data
US 2013/0224536 A1 Aug. 29, 2013

(30) Foreign Application Priority Data
Feb. 29, 2012 (JP) ................ 2012-044471

(51) Int. Cl.
*H01M 2/30* (2006.01)
*H01M 2/06* (2006.01)
*H01M 2/02* (2006.01)
*H01M 2/26* (2006.01)

(52) U.S. Cl.
CPC *H01M 2/30* (2013.01); *H01M 2/06* (2013.01); *H01M 2/0217* (2013.01); *H01M 2/26* (2013.01)

(58) Field of Classification Search
CPC ........... H01M 2/04; H01M 2/06; H01M 2/08; H01M 2/30
USPC ................................. 429/178–179
See application file for complete search history.

(56) References Cited

U.S. PATENT DOCUMENTS

| 2008/0241679 | A1 | 10/2008 | Okutani et al. |
| 2009/0087737 | A1 | 4/2009 | Yamauchi et al. |
| 2011/0045345 | A1 | 2/2011 | Tsuchiya et al. |
| 2011/0076552 | A1 | 3/2011 | Taniguchi et al. |
| 2011/0177387 | A1* | 7/2011 | Byun et al. ................ 429/178 |
| 2011/0244281 | A1* | 10/2011 | Byun ......................... 429/62 |

FOREIGN PATENT DOCUMENTS

| JP | 2008-251411 A | 10/2008 |
| JP | 2009-9868 A | 1/2009 |

(Continued)

OTHER PUBLICATIONS

Nagai et al. JP 2010-033766. Jul. 25, 2008. English machine translation by JPO.*

*Primary Examiner* — Kenneth Douyette
*Assistant Examiner* — James Lee
(74) *Attorney, Agent, or Firm* — Westerman, Hattori, Daniels & Adrian, LLP

(57) ABSTRACT

A groove is formed in a ring shape and a ring-shaped convexity is formed on the periphery of a through-hole of a positive electrode terminal plate. An upper end side of a crimping part of a positive electrode exterior terminal is inserted through the through-hole of the positive electrode terminal plate and crimped, and welded spots are formed by irradiation with high-energy beams between a distal end side of the crimping part and the convexity. The mechanical and electrical connection of an exterior terminal and a terminal plate to the crimping part through welding with high-energy beams makes it possible to provide a prismatic secondary battery of enhanced reliability in which cracking is less likely to occur in the welded spots, the coupling strength between the exterior terminal and the terminal plate is increased, and fluctuations in the internal resistance are curbed.

15 Claims, 9 Drawing Sheets

(56) References Cited

FOREIGN PATENT DOCUMENTS

| JP | 2009-87693 A | 4/2009 |
| JP | 2009-283256 A | 12/2009 |
| JP | 2010-33766 A | 2/2010 |
| JP | 2011-76867 A | 4/2011 |

* cited by examiner

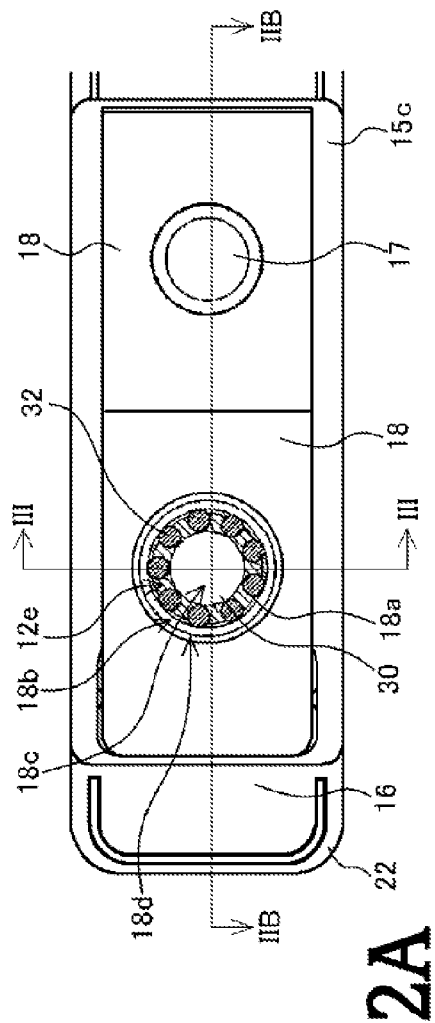
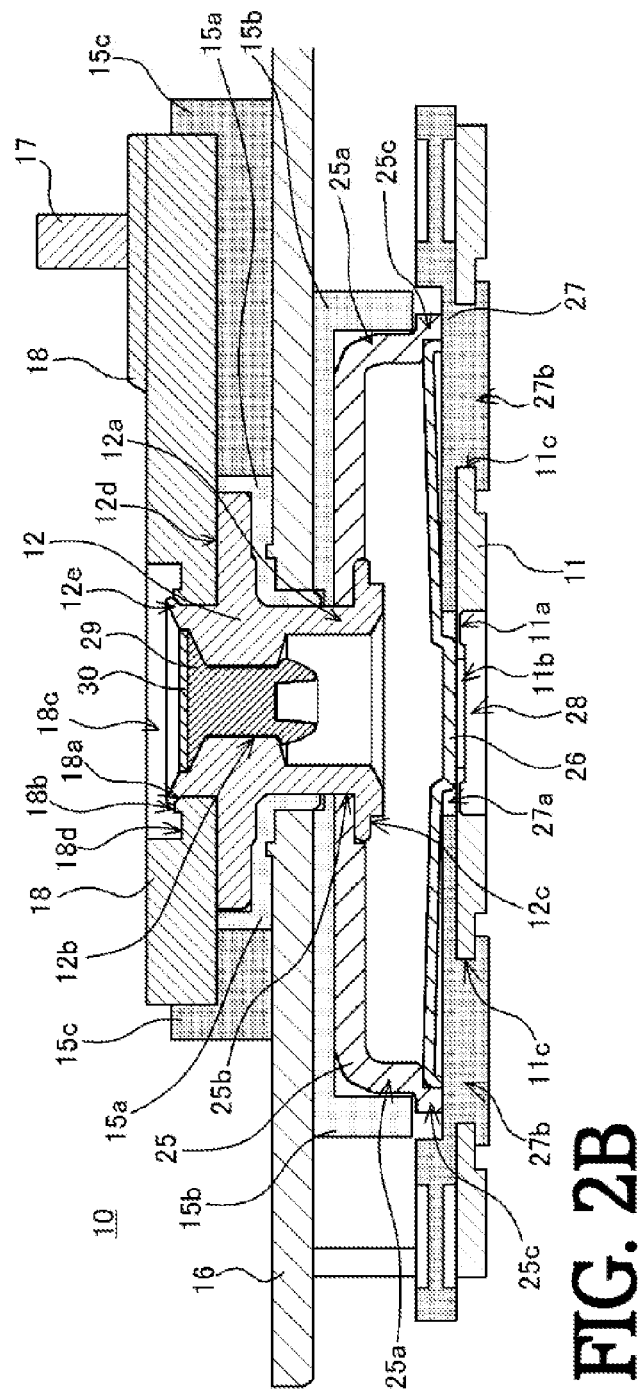
FIG. 2A
FIG. 2B

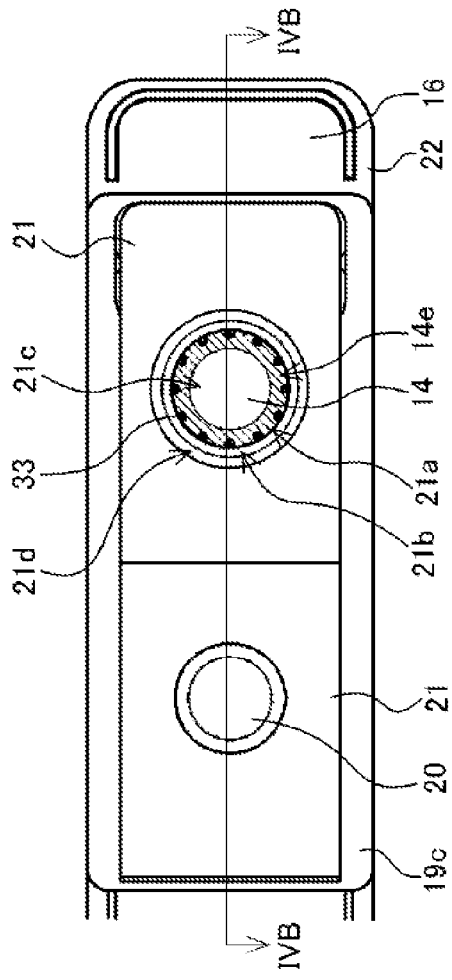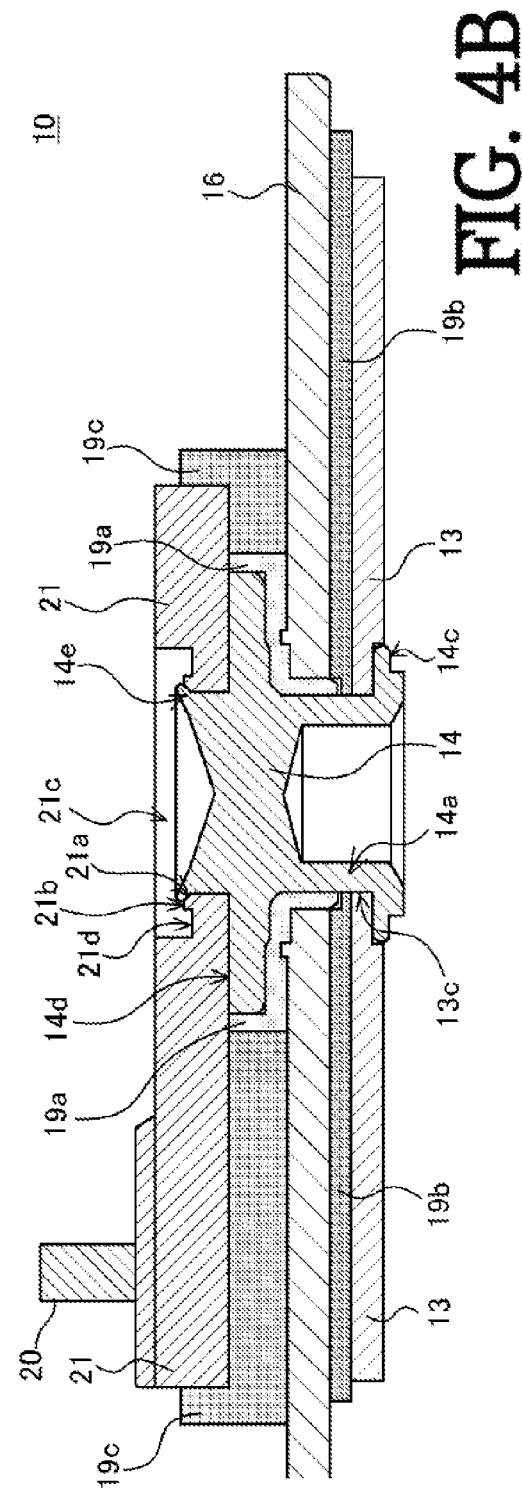

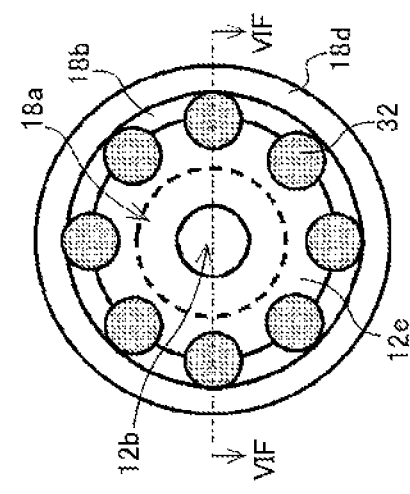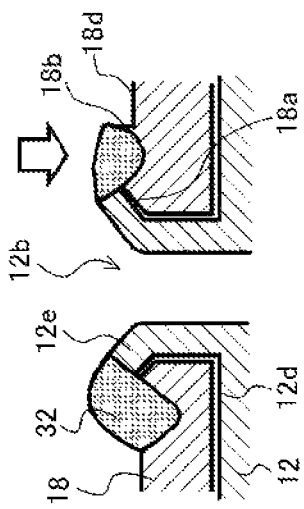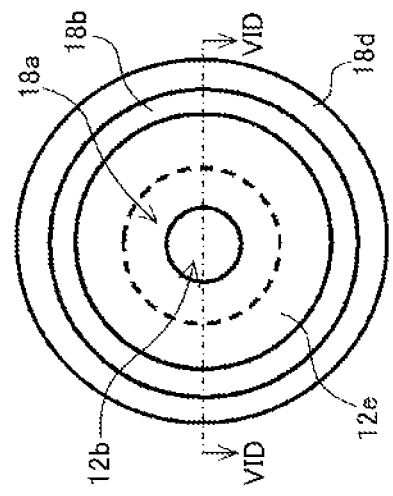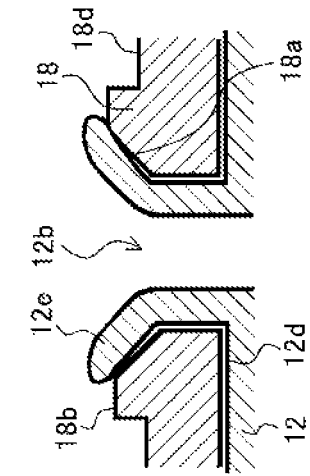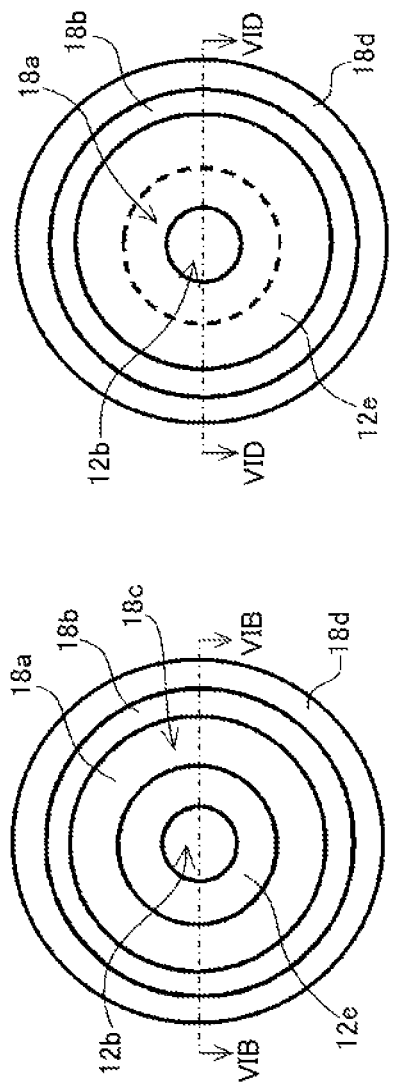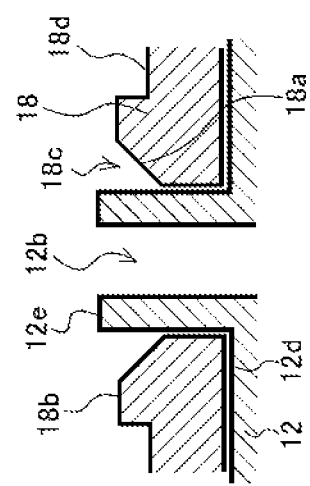

PRISMATIC SECONDARY BATTERY

TECHNICAL FIELD

The present invention relates to a prismatic secondary battery provided with a coupling part where an exterior terminal and a terminal plate is connected by crimping and welding by high-energy beams.

BACKGROUND ART

Alkaline secondary batteries, which are typified by nickel-hydrogen batteries, and non-aqueous electrolyte secondary batteries, which are typified by lithium ion batteries, are often used as a drive power source for portable electronics, such as portable telephones, including smartphones, as well as portable computers, personal digital assistants (PDA), and portable music players. Alkaline secondary batteries and non-aqueous electrolyte secondary batteries are also often used in stationary storage battery systems such as for applications for curbing fluctuations in the output of power sources for driving electric vehicles (EVs) and hybrid electric vehicles (HEVs, PHEVs), solar power generation, wind power generation, and the like, peak-shifting applications in system power for accumulating power overnight for use during the day, and so forth. Especially in EV, HEV, and PHEV applications or stationary storage battery systems, high-capacity and high-output properties are required, and thus individual batteries are increased in size and a plurality of batteries are connected in parallel or in series for use, but the use of a prismatic secondary battery is popular given its space efficiency.

When a prismatic secondary battery is used in such applications, not only must the battery capacity be increased, but also the battery must have high output; however, because a large electrical current flows to the battery in the process of high-output discharging, it is necessary to lower the internal resistance of the battery. For this reason, with the objective of reducing as much as possible the internal resistance of the battery and also of preventing fluctuations in the internal resistance, a variety of improvements have also been made as regards achieving higher reliability and lower resistance at a coupling part of the battery interior or a terminal section.

Conventionally, mechanical crimping has often been used as a method for achieving lower resistance in a terminal section of a battery or a coupling part of the battery interior. With mechanical crimping alone, however, changes in the electrical resistance over time occur when the battery is used in an EV, HEV, PHEV, or a similar environment that vibrates considerably, and therefore a boundary section of a coupling portion, created by the crimping, has been welded using a high-energy beam such as a laser, as is also disclosed in Japanese Laid-open Patent Publications Nos. 2009-087693, 2008-251411, and 2010-033766. When the entirety of the boundary section is welded, melting of the portion to which the force of crimping is applied leads to weakening of the crimping force, for which reason only a part of the boundary section is spot-welded with high-energy beams. Japanese Laid-open Patent Publications Nos. 2008-251411, and 2010-033766 disclose examples in which welding with high-energy beams was carried out along a boundary section of a coupling portion created by crimping, for each of a plurality of regions, so that a plurality of welding spots overlap with each other.

In particular, the method disclosed in Japanese Laid-open Patent Publication No. 2008-251411 for forming a connecting part that connects a collector and a terminal is described, with reference to FIG. 9, as regards a case where laser light is used as the high-energy beams.

A coupling part 60, disclosed in Japanese Laid-open Patent Publication No. 2008-251411, for a collector and a terminal is provided with: a cover plate 61 fixed to a battery outer casing (not shown); an inside insulating and sealing material 62 and an exterior insulating and sealing material 63; a collector 64 connected to a power generation element; and a rivet terminal 65. The inside insulating and sealing material 62 and the exterior insulating and sealing material 63 have a through-hole and are disposed in both inner and outer rim parts of a hole formed in the cover plate 61. The collector 64 is superposed on the inside insulating and sealing material 62. The rivet terminal 65 has a crimping part 65b that projects from a flange part 65a.

The coupling part 60 is assembled so that the crimping part 65b of the rivet terminal 65 penetrates the outer insulating and sealing material 63, an opening of the cover lid 61, the inside insulating and sealing material 62, and a rivet terminal hole of the collector 64 from the outer circumference side of the cover plate 61; and crimping is then performed so as to cause the crimping part 65b of the rivet 65 to be pressed toward the collector 64 side, resulting in an integrated assembly. Prepared next is a work punch A that has a recess complementary to the crimping part 65b of the rivet terminal 65, and has on the rim of the recess an inclined part A1 having a predetermined angle. The work punch A is then pushed in so that the inclined part A1 abuts a distal end 65c of the crimping part 65b, and the distal end 65c of the crimping part 65b is partially deformed and shaped so that, as illustrated in FIG. 9B, the distal end 65c of the crimping part 65b becomes a circular truncated cone. The shape of the distal end 65c of the crimping part 65b is thus adjusted so as to have an obtuse angle.

Next, as illustrated in FIGS. 9B and 9C, laser spot welding is carried out by irradiating with a laser light LB from the perpendicular direction of the upper surface of the circular truncated cone of the distal end 65c of the crimping part 65b, or a direction close thereto. The range irradiated with the laser light LB at this time is a region that includes at least the collector 64 and the circular truncated cone of the distal end 65c of the crimping part 65b, and the collector 64 and the circular truncated cone of the distal end 65c of the crimping part 65b are butt-welded together. This laser spot welding offers deviation-free transmission of the energy of the irradiated laser light to both the collector 64 and the circular truncated cone of the distal end 65c of the crimping part 65b, and forms a favorable welded spot (nugget) 66 on a welded part.

Further, as illustrated in FIG. 9D, the collector 64 and the circular truncated cone of the distal end 65c of the crimping part 65b are butt-welded together so that a plurality of the welding spots 66 are formed so as to overlap with each other along the circular truncated conical portion of the distal end 65c of the crimping part 65b of the collector 64.

When the methods described in Japanese Laid-open Patent Publications Nos. 2008-251411, and 2010-033766 for forming a connecting part are adopted as a method for forming a coupling part in a battery interior, an excellent effect is demonstrated in that there is a decline in internal resistance, changes in the electrical resistance over time are less prone to occur, even in an EV, HEV, PHEV, or a similar environment that vibrates considerably, and higher reliability and lower internal resistance can be achieved in the connecting part of the battery interior or a terminal section.

However, in such a method for forming a connecting part, no consideration is given to the difference in the constituent materials of the positive electrode side and the negative electrode side, and because similar configurations are to be obtained for both the positive electrode side and the negative electrode side, mutually different problems take place on the positive electrode side and the negative electrode side. For example, in a non-aqueous electrolyte secondary battery such as a lithium ion secondary battery, an aluminum-based metal (aluminum or aluminum alloy) is used generically as a core of a positive electrode plate, and a copper-based metal (copper or copper alloy) is used generically as a core of a negative electrode plate. For this reason, in order to curb corrosion caused by contact between dissimilar metals, a generically used positive electrode collector and positive electrode external terminal are both made of an aluminum-based metal, and a generically used negative electrode collector and negative electrode external terminal are both made of a copper-based metal.

Of these, an aluminum-based metal has low material strength, and it is difficult to ensure the coupling strength with crimping alone. For this reason, preferably, the coupling strength and the electrical conductivity of the positive electrode side are ensured by combining welding by high-energy beams and crimp-fixing. Further, because of the high material strength of copper-based metals, a firm coupling strength can be ensured with crimping alone, but, similarly with respect to the positive electrode side, it is more preferable to also carry out welding with high-energy beams. In a case where crimp fixing and welding with high-energy beams, such as is described in Japanese Laid-open Patent Publications Nos. 2008-251411, and 2010-033766, are combined, however, cracking sometimes takes place in the welded spots formed on the welded parts created by the high-energy beams, and a decline in production yield has been observed.

As a result of repeating a variety of tests aimed at pursuing the factors causing such cracking to occur in the welded spots, the present inventors have learned that one cause is that because stress is applied to a crimp fixing part, a transversely directed tensile stress is applied to the welded parts in the process of the solidification of the welded spots in the case where crimp fixing and welding by high-energy beams are combined. By further repeating experimentation to devise a configuration for the crimp fixing part, the present inventors have also discovered that it is possible to reduce the tensile stress in the lateral direction for the welded spot in the process of the solidification of the welded spot, and that it is possible for cracking to be less prone to take place at the welded spot, thus completing the present invention.

SUMMARY

That is, an objective of the present invention is to provide a prismatic secondary battery provided with an exterior terminal and a terminal plate which are connected together by both a crimping part and a welded part that is created by high-energy beams, wherein cracking is less prone to occur at a welded spot, fluctuations in the interior resistance are inhibited during use, and reliability is enhanced.

In order to achieve the foregoing objective, a prismatic secondary battery of the present invention comprises:

a prismatic outer casing having an opening;

an electrode assembly having a positive electrode plate and a negative electrode plate, the electrode assembly being accommodated within the prismatic outer casing;

a positive electrode collector electrically connected to the positive electrode plate;

a negative electrode collector electrically connected to the negative electrode plate;

a sealing body for sealing the opening of the outer casing;

a positive electrode exterior terminal and a negative electrode exterior terminal inserted into respective first through-holes provided to the sealing body, each of the terminals being inserted so as to be electrically insulated from the sealing body via respective insulating members; and a positive electrode terminal plate and a negative electrode terminal plate arranged on the positive electrode exterior terminal and the negative electrode exterior terminal, respectively, the positive electrode collector and the negative electrode collector being electrically connected to the positive electrode terminal plate and the negative electrode terminal plate, respectively, wherein the prismatic secondary battery is characterized in that:

each of the positive electrode terminal plate and the negative electrode terminal plate has a second through-hole, and an upper end part of the positive electrode exterior terminal and the negative electrode exterior terminal are inserted from a lower end side into the second through-holes of the positive electrode terminal plate and the negative electrode terminal plate, respectively;

at least one of the second through-holes has a convexity formed on an edge of the upper end side; and the upper end part(s) of the positive electrode exterior terminal and/or the negative electrode exterior terminal inserted into the second through-hole(s) on the side where the convexity is formed is/are crimped and connected to the positive electrode terminal plate and/or the positive electrode terminal plate and, straddling the positive electrode terminal plate and/or the negative electrode terminal plate, is fused with at least a part of the convexity by irradiation with high-energy beams, thus forming welded spots.

In the prismatic secondary battery, in order for a plurality of the prismatic secondary batteries to be connected in series or in parallel, a positive electrode terminal plate and a negative electrode terminal plate for fixing a bus bar or wiring by, for example, bolt fastening or welding are provided to the positive electrode exterior terminal and the negative electrode exterior terminal. When the bus bar or wiring is fixed to the positive electrode terminal plate or the negative electrode terminal plate, a transversely directed stress is sometimes applied to a crimping part or the welded spots, by way of the positive electrode terminal plate or the negative electrode terminal plate, and thus there is a demand for high mechanical strength to be provided to the crimping part or welded spots.

In the prismatic secondary battery of the present invention, on at least one side among the positive electrode side and the negative electrode side, a convexity is formed on the edge of the upper end side of the through-hole, an exterior terminal is crimp-fixed to a terminal plate, and the exterior terminal and the terminal plate are connected together by welding with high-energy beams, and thus it is possible for the coupling strength between the exterior terminal and the terminal plate to be higher and yet also for fluctuations in the internal resistance to be curbed during usage and for favorable electrical continuity to be ensured. The question of whether it should be the positive electrode side or the negative electrode side where the convexity is formed on the upper end side of the through-hole, the exterior terminal is crimp-fixed to the terminal plate, and the exterior terminal and the terminal plate are connected together by welding with high-energy beams can be determined as desired, and this configuration may also be applied to both the positive electrode side and the negative electrode side. Alternatively, it is possible, on only one side from among the positive electrode side and the negative electrode side, for the connection between the exterior terminal and the terminal plate to be a connection achieved by crimp fixing alone or to be a connection achieved by welding with high-energy beams alone. Further, the convexity formed on the edge of the upper end side of the positive electrode terminal plate and/or negative electrode terminal plate may be formed to be a ring shape or formed in such a shape that the ring shape is partially discontinuous.

In addition, in the prismatic secondary battery of the present invention, on a side of the positive electrode side and the negative electrode side where the convexity is formed in the terminal plate, the welded spots are formed so as to fuse at least a part of the convexity, straddling the exterior terminal and the terminal plate. The outer peripheral side of the convexity is opened, and therefore the transversely directed tensile stress that occurs when a melted part formed by the irradiation with high-energy beams is solidified is weaker than a case where the convexity is not formed. For this reason, according to the present invention, cracking is less prone to take place in the welded spots, and a prismatic secondary battery having enhanced reliability is obtained, because the transversely directed tensile stress applied to the welded spots when the welded spots are solidified is lower.

In the prismatic secondary battery of the present invention, the welded spots formed by the irradiation with high-energy beams may be formed on only one of either the positive electrode side or the negative electrode side, but may also be formed on both. Laser light or an electron beam can be used as the high-energy beams.

In the prismatic secondary battery of the present invention, preferably, the positive electrode exterior terminal is made of an aluminum-based metal, and the negative electrode exterior terminal is made of a copper-based metal.

Among prismatic secondary batteries, in particular in non-aqueous electrolyte secondary batteries, an aluminum-based metal (aluminum or an aluminum alloy) is popularly used as the substrate of the positive electrode plate, and a copper-based metal (copper or a copper-based metal) is popularly used as the substrate of the negative electrode plate. For this reason, a more highly reliable prismatic secondary battery is obtained when the positive electrode exterior terminal used is made of an aluminum-based metal and the negative electrode exterior terminal used is made of a copper-based metal, because corrosion caused by contact between dissimilar metals is less prone to take place.

Also, preferably, the positive electrode terminal plate is made of the same aluminum or aluminum alloy as the positive electrode exterior terminal. For the negative electrode exterior terminal, it would be possible to use not only copper or a copper-based metal, but also nickel, stainless steel, iron, aluminum, an aluminum alloy, or the like, and a negative electrode exterior terminal where the surface of each of the members has been nickel-plated could also be used. For the negative electrode terminal plate, it would be possible to use not only copper or a copper-based metal, but also nickel, stainless steel, iron, aluminum, an aluminum alloy, or the like, and a negative electrode exterior terminal where the surface of each of the members has been nickel-plated could also be used.

In a prismatic secondary battery where the positive electrode exterior terminal is made of an aluminum-based metal, preferably, the welded spots are formed straddling the positive electrode exterior terminal and the positive electrode terminal plate, and the maximum cross-sectional area of a position corresponding to the convexity in a vertical cross-sectional surface passing through the center of the second through-hole is 80% of the cross-sectional area of the convexity or more.

The phrase "maximum cross-sectional area of a position corresponding to the convexity" of the welded spots in the present invention signifies the maximum value of the cross-sectional area of a welded spot formed at a position corresponding to the convexity, in a plane cut by a vertical plane passing through the center of the second through-hole. The phrase "cross-sectional area of the convexity" signifies the cross-sectional area of the convexity in a plane cut by a vertical plane passing through the center of the second through-hole. In the prismatic secondary battery of the present invention, because the welded parts are formed in a spotted fashion, sites that are not melted also exist on the convexity.

When the portion melted by irradiation with high-energy beams is solidified, the melted portion contracts more than does a portion of the periphery that was not melted, and thus a tensile stress is applied to the welded spots. Although an aluminum-based metal has a lower mechanical strength than does a copper-based metal, when the size of the welded spots formed on the aluminum-based metal is increased, it is possible to increase the tensile stress resistance of the welded spots, and cracking is less prone to occur to the welded spots.

The optimal size of the welded spots formed on the positive electrode size varies depending on the height and width of the convexity, but when the welded spots are to account for the majority of the cross-section of the convexity in the radial direction of the second through-hole, it is possible to increase the tensile stress resistance of the welded spots; this effect can be demonstrated very favorably when the maximum cross-sectional area of at least the welded spots of the position corresponding to the convexity in the radial direction of the second through-hole is made to be 80% of the cross-sectional area of the convexity or more. In the prismatic secondary battery of the present invention, the convexity will not become a level surface even when all of the cross-section of the convexity in the radial direction of the second through-hole is melted, and thus this configuration is included within the scope of the present invention.

In a prismatic secondary battery of this aspect, preferably, the welded spots are formed straddling the positive electrode exterior terminal and the positive electrode terminal plate and straddling the negative electrode exterior terminal and the negative electrode terminal plate, respectively, and the diameter of the welded spots formed straddling the positive electrode exterior terminal and the positive electrode terminal plate is greater diameter than the diameter of the welded spots formed straddling the negative electrode exterior terminal and the negative electrode terminal plate.

A positive electrode exterior terminal made of an aluminum-based metal has a lesser crimping strength than does a negative electrode exterior terminal made of a copper-based metal. According to the prismatic secondary battery of this aspect, because the diameter of the welded spots on the positive electrode side is made to be greater than the diameter of the welded spots on the negative electrode side, it becomes possible to ensure the mechanical strength and electrical continuity between the exterior terminal and terminal plate that are optimal depending on the respective material used.

In the prismatic secondary battery of the present invention, preferably, a taper part that expands in diameter going upward is formed on the upper end side of at least one of the second through-holes formed on the positive electrode terminal plate and the negative electrode terminal plate.

When a taper part that expands in diameter going upward is formed on the upper end side of a second through-hole, the bend angle from when the distal end side of the positive electrode exterior terminal or negative electrode exterior terminal is crimped is smaller, and thus the distal end side of the positive electrode exterior terminal or negative electrode exterior terminal is less prone to be broken during crimping, and a prismatic secondary battery of greater reliability is obtained.

In the prismatic secondary battery of the present invention, preferably, the upper end part of the positive electrode exterior terminal or the negative electrode exterior terminal on the side where the convexity is formed protrudes above the convexity.

When the upper end part of the positive electrode exterior terminal or the negative electrode exterior terminal on the side where the convexity is formed protrudes above the convexity, the welded spots adopt a rounded shape, and the tensile stress when the welded spots are solidified can be further distributed, and thus cracking is even less prone to take place in the welded spots, and a prismatic secondary battery of even further enhanced reliability is obtained.

In the prismatic secondary battery of the present invention, preferably, a brim part on which the positive electrode terminal plate or the negative electrode terminal plate is placed is formed on the outer peripheral part of the positive electrode exterior terminal or the negative electrode exterior terminal.

When the configuration of such description is adopted, the positive electrode terminal plate or the negative electrode exterior terminal plate can be placed on the brim part of the positive electrode exterior terminal and the negative electrode exterior terminal in a stabilized state, and thus when the upper end part of the positive electrode exterior terminal and the negative electrode exterior terminal are crimped, a clearance is less prone to be formed between the crimping part and the positive electrode terminal plate or the negative electrode terminal plate even though the shape of the crimping part may have a certain degree of variance. In addition, heat is less easily transferred to the insulating members between the sealing body and the positive electrode exterior terminal and the negative electrode exterior terminal, and a decline in sealing performance effectuated by the insulating member can be curbed, and thus a prismatic secondary battery of even more enhanced reliability is obtained.

In the prismatic secondary battery of the present invention, preferably, the crimping part of the positive electrode exterior terminal and the negative electrode exterior terminal is ring-shaped. In this case, preferably, spin-crimping is used to deform the crimping parts of the positive electrode exterior terminal and the negative electrode exterior terminal when the crimping parts are in a cylindrical shape before being crimped.

When the shape of the crimping part is ring-shaped, an external force applied to the crimping part is isotropically distributed from the center side of the crimping part, and thus the strength of the crimping part is even higher. Also, although in many cases a great deal of force is not applied to the crimping part in order to limit deformation around the crimping part, firm crimp fixing becomes possible even when a great deal of force is applied when a cylindrical member is spin-crimped.

In the prismatic secondary battery of the present invention, preferably, the welded spots are formed at a plurality of sites.

When the welded spot is only at one site, an improvement can be realized by causing the welded spots to be at a plurality of sites in a case where the mechanical strength or electrical continuity between the positive electrode terminal plate and the positive electrode exterior terminal or between the negative electrode terminal plate and the negative electrode exterior terminal is not adequate. However, when there are too many of the welded spots formed by high-energy beams, a portion to which the force of crimping is applied will have melted and the force of crimping will be weaker. For this reason, preferably, the plurality of welded spots created by high-energy beams on a coupling part between the positive electrode terminal plate and the positive electrode exterior terminal and between the negative electrode terminal plate and the negative electrode exterior terminal are made so as not to overlap.

In the prismatic secondary battery of this aspect, preferably, the plurality of welded spots are formed so as to be at equal intervals.

When the configuration of such description is provided, force is applied evenly to the welded spots when a force is applied to the positive electrode terminal plate or the negative electrode terminal plate, and therefore the strength of the coupling part between the positive electrode exterior terminal and the positive electrode terminal plate or between the negative electrode exterior terminal and the negative electrode terminal plate is even greater, and a prismatic secondary battery of even higher reliability is obtained.

In the prismatic secondary battery of the present invention, preferably, a pressure-sensitive electrical current breaker mechanism is provided between the positive electrode collector and the positive electrode exterior terminal and/or between the negative electrode collector and the negative electrode exterior terminal, and the interior of the outer casing is sealed off.

When the configuration of such description is adopted, the electrical current breaker mechanism acts to prevent an electrical current from flowing to the exterior when the pressure of the interior of the outer casing increases to a predetermined value or higher, and thus a prismatic secondary battery offering excellent safety is obtained.

In the prismatic secondary battery of the present invention, the electrode assembly can be an electrode of the flattened shape, an end part on one side of which having positive electrode substrate exposed portions laminated in a plurality of layers, and an end part on the other side of which having negative electrode substrate exposed portions laminated in a plurality of layers; the positive electrode substrate exposed portions being arranged so as to face a side wall of the one side of the prismatic outer casing; the negative electrode substrate exposed portions being arranged so as to face a side wall of the other side of the prismatic outer casing; the positive electrode collector being connected to the positive electrode substrate exposed portions; and the negative electrode collector being connected to the negative electrode substrate exposed portions.

When the positive electrode substrate exposed portions and the negative electrode substrate exposed portions are arranged on the two respective ends of the prismatic outer casing, the distance between the positive electrode collector and the negative electrode collector can be increased, and thus the prismatic secondary battery can be given a greater capacity, and the assembly of the prismatic secondary battery becomes easier. In addition, in the prismatic secondary battery of the present invention, because the collectors are connected to the exposed substrate parts laminated in a plurality of layers, the interior resistance is lower, and the battery will offer excellent output properties.

BRIEF DESCRIPTION OF THE DRAWINGS

FIG. 2A is a plan view of a positive electrode side of the prismatic non-aqueous electrolyte secondary battery illustrated in FIG. 1, and FIG. 2B is an enlarged cross-sectional view taken along line IIB-IIB in FIG. 2A;

FIG. 4A is a plan view of a negative electrode side of the prismatic non-aqueous electrolyte secondary battery illustrated in FIG. 1, and FIG. 4B is an enlarged cross-sectional view taken along line IVB-IVB in FIG. 4A;

FIG. 6A is a plan view of a state where a positive electrode exterior terminal has been entered into a through-hole of a positive electrode terminal plate, FIG. 6B is a cross-sectional view taken along line VIB-VIB in FIG. 6A, FIG. 6C is a plan view of a state where spin-crimping has been carried out, FIG. 6D is a cross-sectional view taken along line VID-VID in FIG. 6C, FIG. 6E is a plan view of after laser welding has been performed, and FIG. 6F is a cross-sectional view taken along line VIF-VIF in FIG. 6E;

DETAILED DESCRIPTION

The prismatic secondary battery of the present invention is described below by a working example and comparative example, with reference to the accompanying drawings. The prismatic secondary battery illustrated below, however, offers the illustrative example of a prismatic non-aqueous electrolyte secondary battery serving as the prismatic secondary battery, in order for the technical concept of the present invention to be understood, and the present invention is not intended to be limited to being the prismatic non-aqueous electrolyte secondary battery; rather, the present invention can be equally well applied to a variety of modifications that are carried out without departing from the technical concepts illustrated by the claims.

Also, the prismatic secondary battery as in the present invention can be applied to a prismatic secondary battery having an electrode assembly given a flattened shape by laminating or winding a positive electrode plate and a negative electrode plate with a separator interposed therebetween, but the prismatic secondary battery described below is represented as using a wound electrode assembly having a flattened shape. In the present invention, either laser light or an electron beam could be used as the high-energy beams used for welding, but the high-energy beams described below are represented by laser light.

Further, in each of the drawings related to this description, each of the members is displayed at different reduced scales, as appropriate, in order for the members to be sized so as to be recognizable on the drawings, the display not necessarily being proportional to the actual dimensions. The phrases "up"/"above" and "down"/"below" in the description of the subject application are based on an electrode assembly and sealing body, where the direction from the electrode assembly side toward the sealing body side is expressed as "up"/ "above", and the direction from the sealing body side toward the electrode assembly side is expressed as "down"/"below." In the prismatic non-aqueous electrolyte secondary battery of the working example and the prismatic non-aqueous electrolyte secondary battery of the comparative example, it is merely the configurations of a positive electrode terminal plate and a negative electrode terminal plate that are different, and thus a prismatic non-aqueous electrolyte secondary battery of the working example is used for description in cases where the fundamental configuration of the prismatic non-aqueous electrolyte secondary battery is being described, and cases where a prismatic secondary battery of the comparative example is being described are meant to specifically note the differences thereof.

Figure 1:
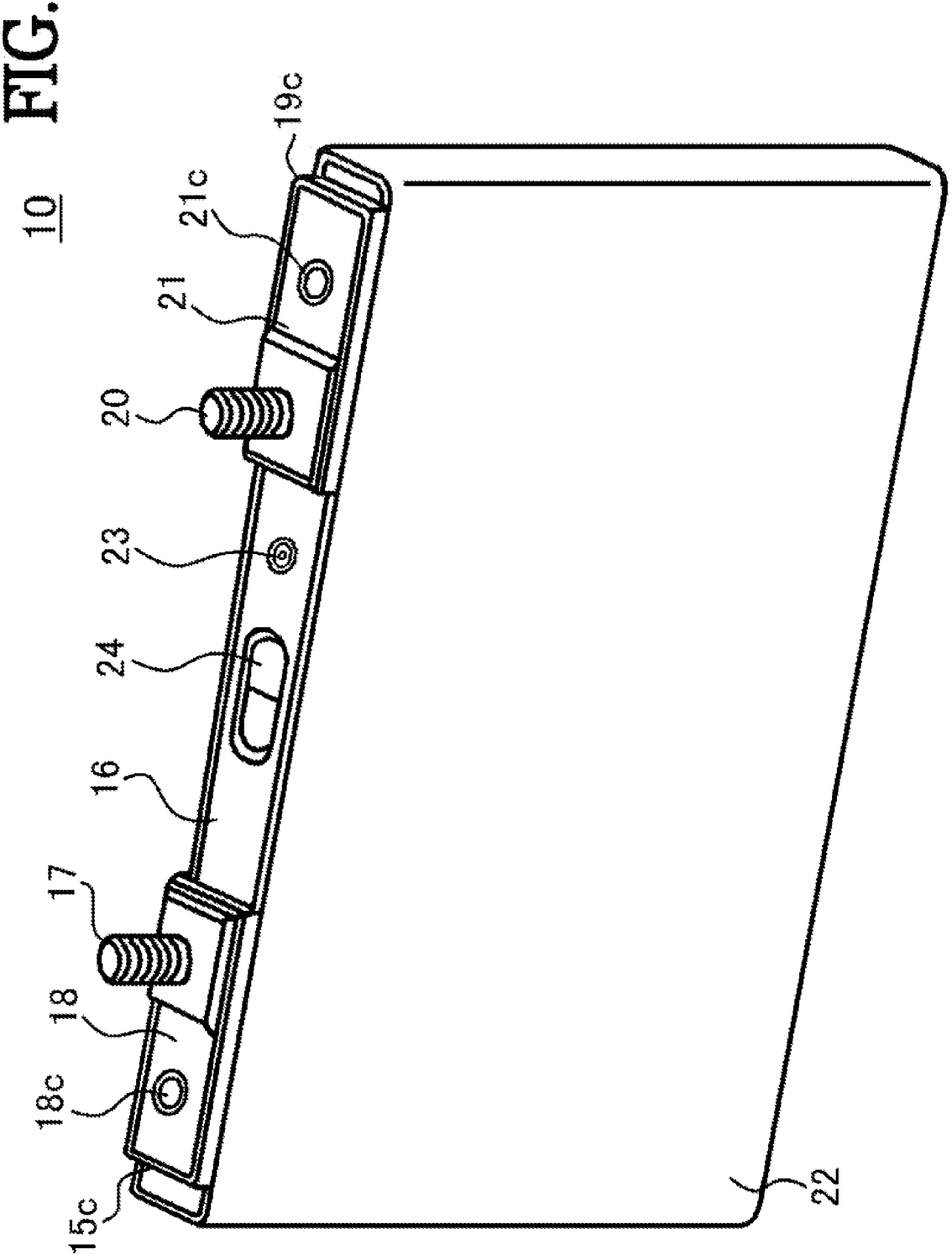
FIG. 1 is a perspective view of a prismatic non-aqueous electrolyte secondary battery common to the working example and comparative example.
Figure 3:
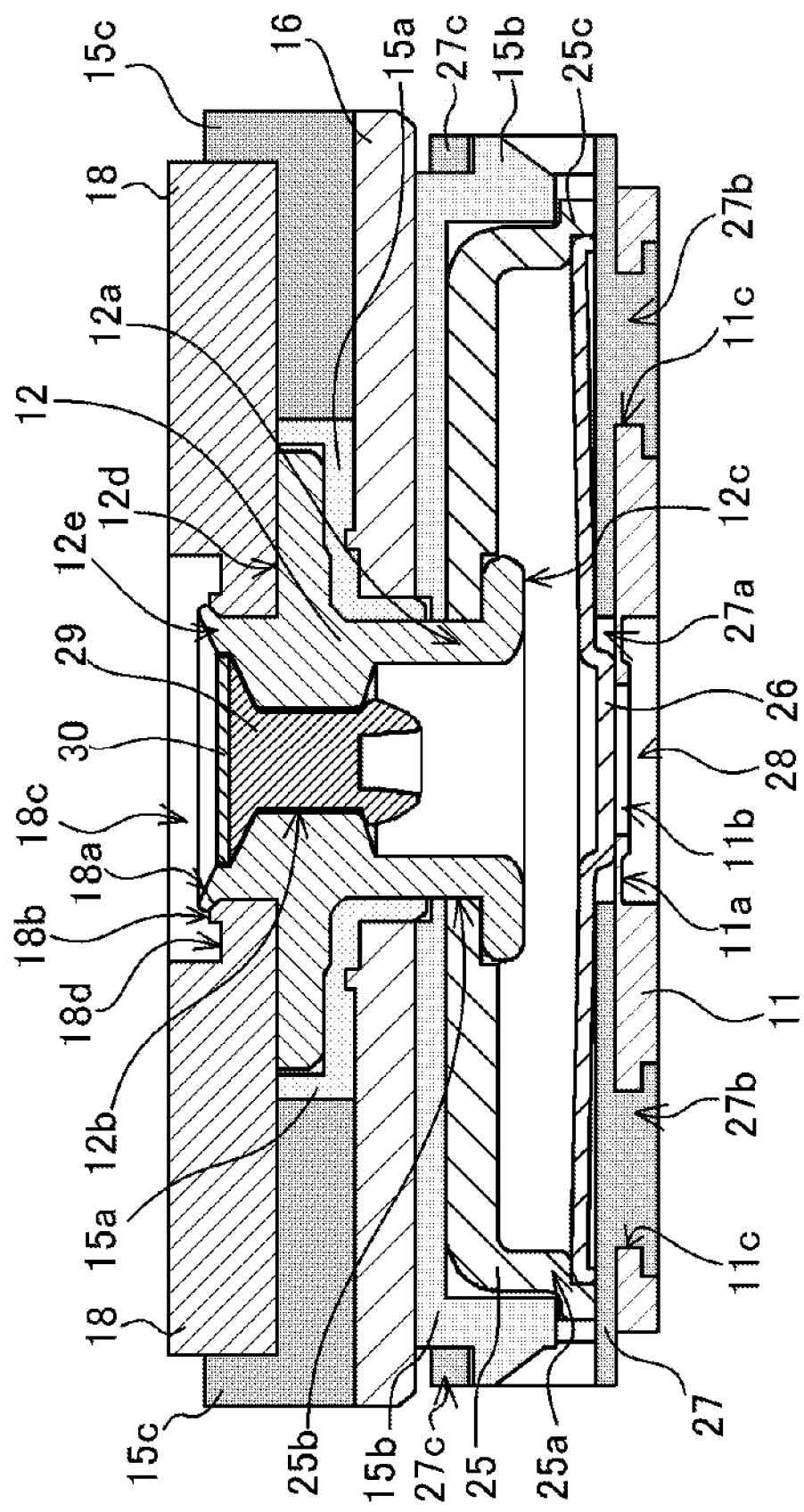
FIG. 3 is an enlarged cross-sectional view taken along line III-III in FIG. 2A.

Firstly, the prismatic non-aqueous electrolyte secondary battery of the working example is described with reference to FIGS. 1 to 6. FIGS. 2B, 3, and 4B omit a depiction of a battery outer casing.

A prismatic non-aqueous electrolyte secondary battery 10 of the working example has a flat wound electrode assembly (not shown) in which a positive electrode plate and a negative electrode plate have been wound around with a separator interposed therebetween. The positive electrode plate is prepared by coating both surfaces of a positive electrode substrate made of aluminum foil with a positive electrode active material mixture, drying and rolling same, and thereafter making a slit so that a strip of the aluminum foil is exposed along the lengthwise direction at one end part. The negative electrode plate is prepared by coating both surfaces of a negative electrode substrate made of copper foil with a negative electrode active material mixture, drying and rolling same, and thereafter making a slit so that a strip of the copper foil is exposed along the lengthwise direction at one end part.

The positive electrode plate and negative electrode plate obtained in the manner described above are shifted so that the exposed aluminum foil part of the positive electrode plate and the exposed copper foil part of the negative electrode plate do not overlap with the active material layer of the respectively facing electrode; winding with a microporous separator made of polyethylene interposed therebetween prepares a wound electrode assembly which is provided with a plurality of overlapped positive electrode substrate exposed portions at one end in a winding axis direction and with a plurality of overlapped negative electrode substrate exposed portions at the other end.

The plurality of positive electrode substrate exposed portions are laminated and are electrically connected to a positive electrode exterior terminal 12 via a positive electrode collector 11 (see FIGS. 2B and 3), and, identically, the plurality of negative electrode substrate exposed portions are laminated and are electrically connected to a negative electrode exterior terminal 14 via a negative electrode collector 13 (see FIG. 4B). The positive electrode external terminal 12 is fixed to a sealing body 16 via an upper first insulating member 15a and a lower first insulating member 15b. A positive electrode terminal plate 18 to which a bolt 17 for exterior connection is provided is fixed onto the positive electrode exterior terminal 12. The upper first insulating member 15a and the lower first insulating member 15b correspond to positive-electrode-side insulating members in the present invention. Identically, the negative electrode exterior terminal 14 is fixed to the sealing body 16 via a first insulating member 19a and a second insulating member 19b. A negative electrode terminal plate 21 to which a bolt 20 for exterior connection is provided is fixed onto the negative electrode exterior terminal 14. The first insulating member 19a and the second insulating member 19b correspond to a negative-electrode-side insulating member in the present invention.

The prismatic non-aqueous electrolyte secondary battery 10 of the working example is prepared by inserting the flat wound electrode assembly prepared as described above into a prismatic battery outer casing 22, an insulating resin sheet (not shown) interposed between the outer casing and the periphery of the electrode assembly other than a sealing body 16 side; laser-welding the sealing body 16 to the opening of the battery outer casing 22; injecting a non-aqueous electrolyte solution through an electrolyte solution pouring hole 23; and sealing off the electrolyte solution pouring hole 23. A gas release valve 24 that is opened when a gas pressure higher than the operating pressure of an electrical current breaker mechanism is applied is also provided to the sealing body 16, and the interior of the battery outer casing 22 is sealed in.

The description shall now relate to a pressure-sensitive electrical current breaker mechanism that is interposed between the positive electrode collector 11 and the positive electrode exterior terminal 12, or between the negative electrode collector 13 and the negative electrode exterior terminal 14. The electrical current breaker mechanism may be provided only to the positive electrode side, or may be provided only to the negative electrode side, or may be provided to both the positive electrode side and the negative electrode side, and thus described below is one provided only to the positive electrode, with reference to FIGS. 2B and 3.

The positive electrode collector 11 is connected to the plurality of positive electrode substrate exposed portions arranged on one side end surface side of the flat wound electrode assembly, and the positive electrode collector 11 is electrically connected to the positive electrode exterior terminal 12. The positive electrode exterior terminal 12 is provided with a cylindrical part 12a, and a through-hole 12b is formed in the interior. The cylindrical part 12a of the positive electrode exterior terminal 12 is inserted into holes respectively formed in a gasket or other upper first insulating member 15a, the sealing body 16, a lower first insulating member 15b, and an electroconductive member 25 having a cylindrical part 25a; and a distal end part 12c thereof is crimped to integrally fix same together. In the electroconductive member 25, the cylindrical part 25a is formed on a lower side, i.e., on the flat wound electrode assembly side, and an opening hole 25b is formed on an upper side, i.e., on the sealing body 16 side, the inner diameter being reduced and the cylindrical part 12a of the positive electrode exterior terminal 12a being inserted thereinto.

The distal end part 12c of the cylindrical part 12a of the positive electrode exterior terminal 12 is crimped in the vicinity of the opening hole 25b of the electroconductive member 25, and a connecting part connecting the electroconductive member 25 and the distal end part 12c of the cylindrical part 12a of the positive electrode exterior terminal 12 is laser-welded. The positive electrode exterior terminal 12 thereby adopts a state of being electrically connected to the electroconductive member 25, while being electrically insulated from the sealing body 16 by the upper first insulating member 15a and the lower first insulating member 15b.

A flange part 25c is formed on a distal end of the lower side of the cylindrical part 25a of the electroconductive member 25, and the periphery of a reverse plate 26 is hermetically sealed and welded to an inner surface side of the flange part 25c. The reverse plate 26 is shaped so as to protrude downward from the periphery toward the center side, i.e., so as to have an arranged position that is inclined relative to the sealing body 16. The reverse plate 26 is formed of an electroconductive material, and has the function of a valve that deforms more toward the exterior side of the battery, i.e., the upper side as the pressure inside the battery outer casing 22 increases. At the center part of the reverse plate 26, an inner wall portion of a connecting part-forming hole 11b of a thinner region 11a of the positive electrode collector 11 and the surface of the reverse plate 26 are laser-welded together at a plurality of sites.

Arranged between the positive electrode collector 11 and the reverse plate 26 is a second insulating member 27 made of a resin material in which a through-hole 27a is formed, and the positive electrode collector 11 and the reverse plate 26 are electrically connected together via the through-hole 27a. A suitable number of projections 27b are formed on the periphery of the through-hole 27a of the second insulating member 27, the projections 27b being mated to fixing holes 11c formed on the positive electrode collector 11, and the tops of the projections 27b are, for example, heated to expand in diameter, whereby the second insulating member 27 and the positive electrode collector 11 are integrally fixed together. Herein, the first insulating member 27 and the lower first insulating member 15b are fixed together by a latch fixing part 27c.

As such, the positive electrode substrate exposed portions are electrically connected to the positive electrode exterior terminal 12 via the thinner region 11a of the positive electrode collector 11, the reverse plate 26, and the electroconductive member 25. The electrical current breaker mechanism 28 is formed by the cylindrical part 25a of the electroconductive member 25, the reverse plate 26, the second insulating member 27, and the thinner region 11a of the positive electrode collector 11.

More specifically, the reverse plate 26 is made so as to swell toward the through-hole 12b side of the positive electrode exterior terminal 12 when the pressure inside the battery outer casing 22 increases, and the thinner region 11a of the positive electrode collector 11 is welded to the middle part of the reverse plate 26; therefore, a break happens at a portion of the thinner region 11a of the positive electrode collector 11 when the pressure inside the battery outer casing 22 exceeds a predetermined value, and thus the electrical connection between the reverse plate 26 and the positive electrode collector 11 will be cut off.

When the thinner region 11a is present in this fashion, a break is more prone to occur at the portion of the thinner region 11a when the reverse plate 26 is deformed, and when the pressure of the battery interior is elevated, the break will reliably happen at the portion of the thinner region 11a, and thus the safety of the prismatic non-aqueous electrolyte secondary battery 10 is enhanced. Setting the thickness and formation region of the portion of the thinner region 11a as appropriate makes it possible to set to a predetermined value the pressure at which the portion of the thinner region 11a breaks, and thus reliability is also enhanced.

In the example illustrated herein, the thinner region 11a, which is given a lesser thickness than the other portions, is formed in a ring shape on the peripheral portion of the connecting part-forming hole 11b, but the thinner region 11a may also be formed intermittently in a ring shape so as to surround the connecting part-forming hole 11b, and it would also be possible to give the peripheral portion of the connecting part-forming hole 11b the same thickness as other portions and form the thinner region 11a by forming a groove either in a ring shape or intermittently in a ring shape. It would also be possible to provide neither the thinner region 11a nor the groove, and to adjust the connection strength between the reverse plate 26 and the positive electrode collector 11 and cause the connection between the reverse plate 26 and the positive electrode collector 11 to be broken in a case where the reverse plate 26 is deformed.

The through-hole 12b of the positive electrode exterior terminal 12 is used in testing as to whether or not the periphery of the reverse plate 26 constituting the electrical current breaker mechanism 28 has been hermetically welded, but usage in an unaltered state would also be possible. However, preferably, the through-hole 12b of the positive electrode exterior terminal 12 is sealed off, because of the undesirable possibility that the electrical current breaker mechanism 28 will be unable to operate normally in the event that corrosive gas or liquid enters the interior of the through-hole 12b and the reverse plate 26 is corroded. In view whereof, in the prismatic non-aqueous electrolyte secondary battery 10 of the working example, the through-hole 12b formed in the positive electrode exterior terminal 12 is mated with a terminal plug 29 and is firmly sealed through welding of the periphery of a metal plate 20, made of an aluminum-based metal and provided to an upper part of the terminal plug 29. The terminal plug 29 used can also be made of an elastic material or of a resin material, with no metal plate being provided to the upper part thereof.

In the prismatic non-aqueous electrolyte secondary battery 10 of the working example, a space on a side corresponding to the exterior of the electrical current breaker mechanism 28 is entirely sealed off, but even when the pressure inside the battery outer casing 22 increases for any reason whatsoever, the pressure in the sealed space on the exterior side of the battery of the electrical current breaker mechanism 28 will not have a similar increase at the same time, and therefore the operation of the electrical current breaker mechanism 28 will not suffer any problems even when the space on the exterior side of the battery is sealed off.

A description of the specific configuration of a coupling portion coupling the positive electrode exterior terminal 12 and the positive electrode terminal plate 18 in the prismatic non-aqueous electrolyte secondary battery 10 of the working example shall now be given with reference to FIGS. 1 to 3, 5, and 6. A level brim part 12d and a crimping part 12e are formed on the upper part of the positive electrode exterior terminal 12. The crimping part 12e has a cylindrical pre-crimping shape, the interior thereof serving as through-hole 12b, and is in communication with the cylindrical part 12a. In the description below, the reference numeral "12e" is also assigned to the pre-crimping crimping part. The positive electrode terminal plate 18 is placed on the level brim part 12d of the positive electrode exterior terminal 12, and a third insulating member 15c is arranged on a lower periphery part of the positive electrode terminal plate 18 so that the electrical insulation from the sealing body 16 is ensured.

Provided to the positive electrode terminal plate 18 are a taper part 18a that expands in diameter going upward and a through-hole 18c, a convexity 18b being formed at the edge of the taper part 18a. A ring-shaped groove 18d is formed at the periphery of the through-hole 18c on the upper surface of the positive electrode terminal plate 18. The convexity 18b and the groove 18d may be formed to be entirely in a ring shape or in such a shape that the ring shape is partially discontinuous. The top of the convexity 18b may be level or curved or may even be shaped to have a ridged line. The taper part 18a is not an absolutely essential configuration, but when the taper part 18a is provided, there is a smaller bend angle when the crimping part 12e of the positive electrode exterior terminal 12 is crimped, and thus the distal end side of the positive electrode exterior terminal 12 is less easily damaged.

A bolt 17 is vertically provided at a position where neither the through-hole 18c nor the groove 18d is formed. The bolt 17 is provided in order for a bolt (not shown) to fix wiring for exterior connection and/or a bus bar for connecting a plurality of the prismatic non-aqueous electrolyte secondary batteries 10 either in series or in parallel. The cylindrical crimping part 12e of the positive electrode exterior terminal 12 is inserted into the through-hole 18c of the positive electrode terminal plate 18 from below, the lower surface of the positive electrode terminal plate 18 is placed on the brim part 12d of the positive electrode exterior terminal 12, and, the cylindrical crimping part 12e of the positive electrode exterior terminal 12 is crimped in this state, the positive electrode terminal plate 18 and the positive electrode exterior terminal 12 being thus firmly fixed together.

Figure 5:
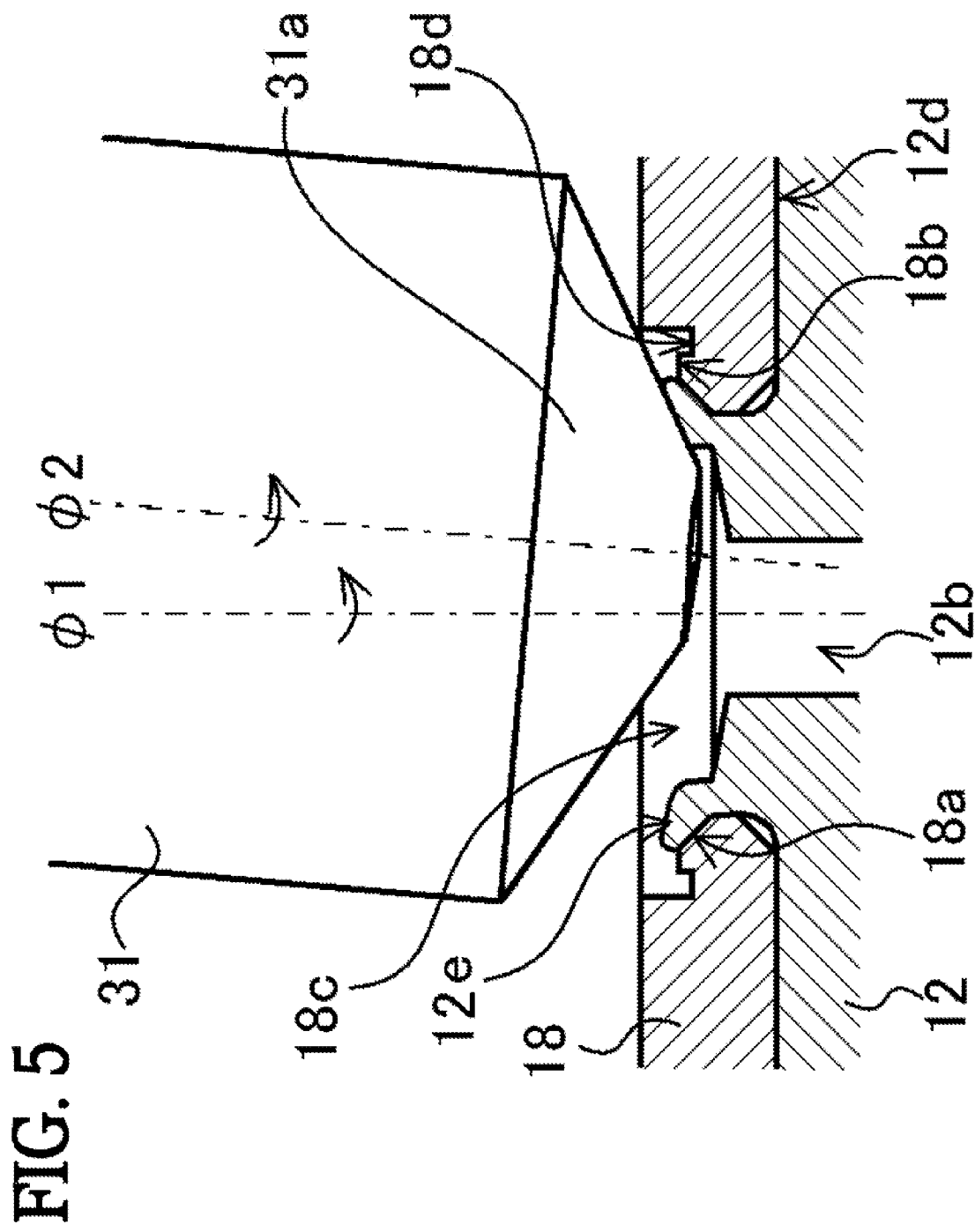
FIG. 5 is a cross-sectional view illustrating a state where a positive electrode exterior terminal is crimp-fixed to a positive electrode terminal plate by spin crimping.

The crimping part 12e of the positive electrode exterior terminal 12 is fixed to the taper part 18a of the positive electrode terminal plate 18 as follows by spin-crimping. Firstly, the state illustrated in FIGS. 6A and 6B is adopted when the cylindrical crimping part 12e of the positive electrode exterior terminal 12 is inserted into the through-hole 18c of the positive electrode terminal plate 18 from below. In this state, a spin-crimping jig 31 is used as illustrated in FIG. 5 to carry out spin-crimping so as to expand the diameter of the cylindrical crimping part 12e from above. The spin-crimping jig 31 is machined so that a distal end part 31a is reduced in diameter, and is driven so as to rotate about a center axis φ1 of the cylindrical crimping part 12e while also rotating about an axis φ2 that is eccentric relative to the center axis φ1 of the cylindrical crimping part 12e. The distal end side of the cylindrical crimping part 12e is thereby increased in diameter and crimp-fixed to the surface of the taper part 18a of the positive electrode terminal plate 18 with no clearance therebetween. This state is illustrated in FIGS. 6C and 6D.

When spin-crimping as described above is performed, it is possible to firmly crimp-fix the distal end side of the cylindrical crimping part 12e of the positive electrode exterior terminal 12 to the surface of the taper part 18a of the positive electrode terminal plate 18, even without applying a great deal of force, and thus no appreciable amount of force is applied to the sealing body 16, the upper first insulating member 15a, the lower first insulating member 15b, or the electrical current breaker mechanism 28, which are all then less prone to be deformed or damaged. Also, because the positive electrode terminal plate 18 is placed on the brim part 12d of the positive electrode exterior terminal 12, the positive electrode terminal plate 18 can be placed in a stabilized state on the brim part 12d of the positive electrode exterior terminal 12, wherefore a clearance will not form between the crimping part 12e and the positive electrode terminal plate 18 even when the shape of the crimping part 12e has a certain degree of variance when, for example, the upper end part of the positive electrode exterior terminal 12 is crimped. Moreover, because heat is less easily transferred to the upper first insulating member 15a and lower first insulating member 15b arranged between the positive electrode exterior terminal 12 and the sealing body 16, it becomes possible to curb a decline in the sealing performance effectuated by the upper first insulating member 15a and the lower first insulating member 15b.

Additionally, in the prismatic non-aqueous electrolyte secondary battery 10 of the working example, as is illustrated in FIGS. 6E and 6F, the distal end of the crimping part 12e of the positive electrode exterior terminal 12 and the convexity 18b of the positive electrode terminal plate 18 are laser-welded together at a plurality of sites, and welded spots 32 are formed at equal intervals at the plurality of sites. A more detailed description of the state of formation of the welded spots 32 shall be provided below.

A description relating to the specific configuration of a coupling portion coupling the negative electrode collector 13 and the negative electrode exterior terminal 14 and of a coupling portion coupling the negative electrode exterior terminal 14 and the negative electrode terminal plate 21 shall be provided with reference to FIG. 4. However, with the exception of the fact that the formation material is made of a copper-based metal, the specific configuration of the negative electrode collector 13 is provided with substantially the same configuration as that of the positive electrode collector 11, and thus a more detailed description thereof shall be omitted. Also, no pressure-sensitive electrical current breaker mechanism is formed on the negative electrode side, and the negative electrode exterior terminal 14 is fixed to the sealing body 16 in a state of being electrically insulated from the sealing body 16 by the first insulating member 19a and the second insulating member 19b.

A connecting part-forming hole 13c is formed on the negative electrode collector 13, and a distal end part 14c of a cylindrical part 14a on a lower side of the negative electrode exterior terminal 14 is inserted into the connecting part-forming hole 13c and thereafter crimp-fixed thereto, the negative electrode collector 13 and the negative electrode exterior terminal 14 thus being integrally coupled together. Connecting parts of the negative electrode collector 13 and the distal end part 14c of the cylindrical part 14a of the lower side of the negative electrode exterior terminal 14 are laser-welded together.

Similarly with respect to the case of the positive electrode exterior terminal 12, a level brim part 14d and a crimping part 14e are formed at an upper part of the negative electrode exterior terminal 14. The negative electrode terminal plate 21 is placed on the level brim part 14d of the negative electrode exterior terminal 14, and a third insulating member 19c is arranged on a lower periphery part of the negative electrode terminal plate 21 so that the electrical insulation from the sealing body 16 is ensured. The crimping part 14e has a cylindrical pre-crimping distal end shape and, unlike the positive electrode exterior terminal 12, no pressure-sensitive electrical current breaker mechanism is provided to the negative electrode side, and thus a through-hole is not formed in the interior.

Provided to the negative electrode terminal plate 21 are a taper part 21a that expands in diameter going upward and a through-hole 21c where a convexity 21b is formed at the edge of the taper part 21a, and a groove 21d is also formed in a ring shape at the periphery of the through-hole 21c on the upper surface of the negative electrode terminal plate 21. Similarly with respect to the case of the positive electrode side, the convexity 21b and the groove 21d may be formed to be entirely in a ring shape or in such a shape that the ring shape is partially discontinuous. Identically, the top of the convexity 21b may be level or curved or may even be shaped to have a ridged line. Also identically, the taper part 21a is not an absolutely essential configuration, but when the taper part 21a is provided, there is a smaller bend angle when the crimping part 14e of the negative electrode exterior terminal 14 is crimped, and thus the distal end side of the negative electrode exterior terminal 14 is less easily damaged.

A bolt 20 is vertically provided at a position where neither the through-hole 21c nor the groove 21d are formed on the upper surface of the negative electrode terminal plate 21. The cylindrical crimping part 14e of the distal end of the negative electrode exterior terminal 14 is inserted into the through-hole 21c of the negative electrode terminal plate 21 from below, the lower surface of the negative electrode terminal plate 21 is placed on the brim part 14d of the negative electrode exterior terminal 14, and, in this state, the cylindrical crimping part 14e of the negative electrode exterior terminal 14 is crimped, the negative electrode terminal plate 21 and the negative electrode exterior terminal 14 being thus firmly fixed together.

Fixing the crimping part 14e of the negative electrode exterior terminal 14 to the taper part 21a of the negative electrode terminal plate 21 is carried out by spin-crimping similarly with respect to the positive electrode side, and the distal end of the crimping part 14e of the negative electrode exterior terminal 14 and the convexity 21b of the negative electrode terminal plate 21 are laser-welded together at a plurality of sites, and welded spots 33 are formed at equal intervals at the plurality of sites.

On the negative electrode side as well, because the negative electrode terminal plate 21 is placed on the brim part 14d of the negative electrode exterior terminal 14, the negative electrode terminal plate 21 can be placed in a stabilized state on the brim part 14d of the negative electrode exterior terminal 14, wherefore a clearance will not form between the crimping part 14e and the negative electrode terminal plate 21 even when the shape of the crimping part 14e has a certain degree of variance when, for example, the upper end part of the negative electrode exterior terminal 14 is crimped. For this reason, similarly with respect to the case of the positive electrode side, it becomes possible to carry out the laser welding in a stabilized state, and thus there will be less variance in the quality of the welded parts on the negative electrode side as well. Heat is less easily transferred to the first insulating member 19a and second insulating member 19b disposed between the negative electrode exterior terminal 14 and the sealing body 16, and thus it becomes possible to curb a decline in the sealing performance effectuated by the first insulating member 19a and the second insulating member 19b.

Because an aluminum-based metal is generally used as the substrate of a positive electrode plate in a non-aqueous electrolyte secondary battery, preferably, the positive electrode collector, the pressure-sensitive electrical current breaker mechanism 28, the positive electrode exterior terminal 12, and the positive electrode terminal plate 18 used for the prismatic non-aqueous electrolyte secondary battery 10 are also made of an aluminum-based metal, in order to curb corrosion caused by contact between dissimilar metals. Similarly, because a copper-based metal is generally used as the substrate of a negative electrode plate, preferably, the negative electrode collector 13, the negative electrode exterior terminal 14, and the negative electrode terminal plate 14 used for the prismatic non-aqueous electrolyte secondary battery 10 are also made of a copper-based metal.

However, on the positive electrode side where an aluminum-based metal is used, there is the undesirable possibility that the strength will not suffice with crimp fixing alone, but forming the large welded spots 32 in addition to crimp fixing makes it possible to ensure strength as well as favorable electrical continuity. Also, although sputtering, cracking, and the like are more likely to occur with a copper-based metal because of the need for a greater deal of energy during welding than for an aluminum-based metal, the strength with crimp fixing alone is sufficient on the negative electrode side where a copper-based metal is used; however, reducing the diameter of the welded spots 33 curbs the occurrence of spatter, cracking, and the like, and also makes it possible to control fluctuations in the internal resistance caused by vibration or the like, and to ensure adequate electrical continuity.

Incidentally, stress caused by crimping remains in the crimping part 12e of the positive electrode exterior terminal 12 and the crimping part 14e of the negative electrode exterior terminal 14. A greater amount of this stress correlates to a greater strength of the crimping part and more favorable vibration resistance, and therefore the stress caused by crimping cannot be entirely eliminated. For this reason, a welding melted part is formed when the distal end of the crimping part 12e, 14e of the positive electrode exterior terminal 12 or the negative electrode exterior terminal 14 and the positive electrode terminal plate 18 or negative electrode terminal plate 21 are laser-welded, but this welding melted part is cooled and, when the welded spots 32, 33 are formed, contracts, and thus a transversely directed tensile force is applied to the welded spots 32, 33, and cracks sometimes take place in the welded spots 32, 33. When cracks take place in the welded spots 32, 33, there is a decline in the reliability of the welded parts, and thus the product must be discarded, resulting in a decline in production yield.

Figure 7B:
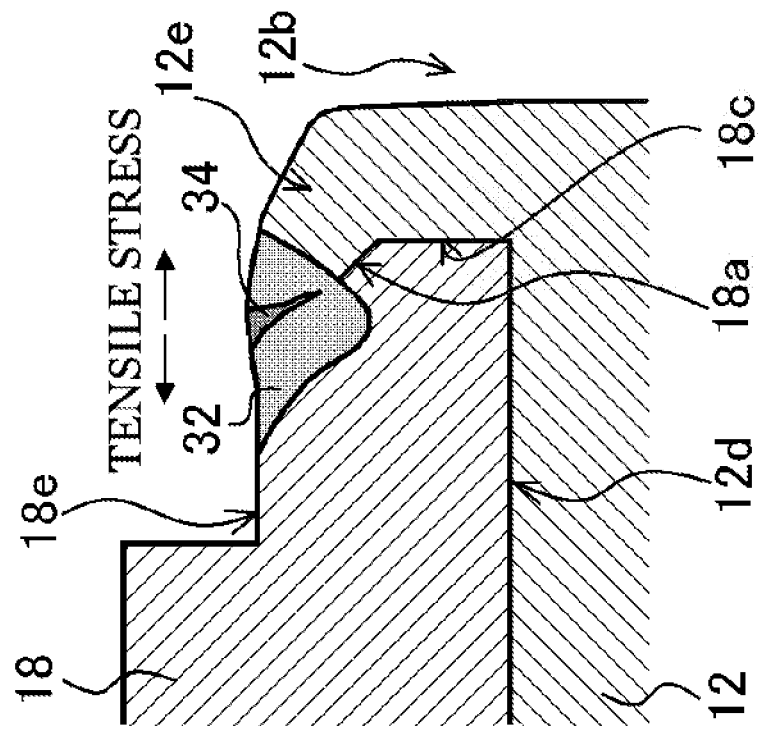
FIG. 7B is a partially enlarged cross-sectional view that identically corresponds to FIG. 6F.
Figure 7A:
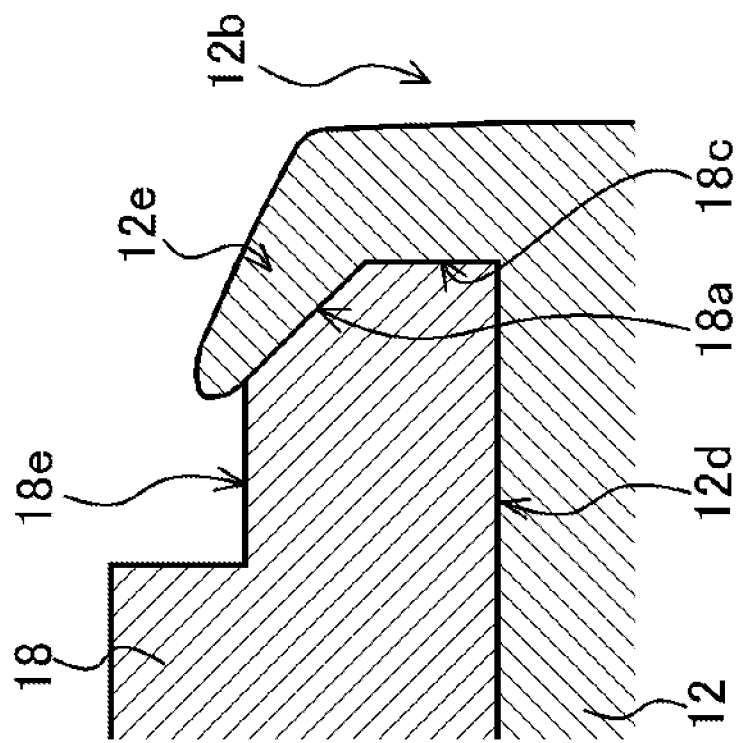
FIG. 7A is a partially enlarged view of a portion in a comparative example that corresponds to FIG. 6D.

The phenomenon of such description whereby cracks take place in the welded spots shall now be described with reference to FIG. 7, which corresponds to the comparative example. FIG. 7A is a partially enlarged view of a portion in the comparative example that corresponds to FIG. 6D, and FIG. 7B is a partially enlarged cross-sectional view of a portion that identically corresponds to FIG. 6F. The configuration of the laser welding sites between the negative electrode terminal plate 21 and the distal end of the crimping part 14e of the negative electrode exterior terminal 14 is similar to that of the positive electrode side, except in that the negative electrode exterior terminal 14 has no through-hole, and thus the following description is representative of that of the positive electrode side.

Firstly, the distal end of the crimping part 12e of the positive electrode exterior terminal 12 corresponding to the comparative example, as is illustrated in FIG. 7A, is positioned above a level part 18e of the positive electrode terminal plate 18. The height of the distal end of the crimping part 12e of the positive electrode exterior terminal 12 may be substantially the same as the height of the level part 18e of the positive electrode terminal plate 18 and yet still be slightly lower than the height of the level part 18e. In such a state, when welding is carried out with laser light irradiation that is centered on the boundary of the distal end of the crimping part 12e of the positive electrode exterior terminal and the level part 18e of the positive electrode terminal plate 18, the welding-melted parts are formed, but heat is evenly transferred to the level part 18e and therefore the upper part of the welding-melted parts will be substantially level. The welding-melted parts, upon cooling, become the welded spots 32, but in this process, tensile stress is applied in the transverse direction, as illustrated by the arrow in FIG. 7B, and when the tensile stress increases, the result is that a crack 34 is formed in the welded spots 32. The tensile force of such description applied to the welded spots 32 takes place because a portion melted by irradiation with laser light contracts more during the process of solidification than does a portion of the periphery which is not melted.

Figure 8A:
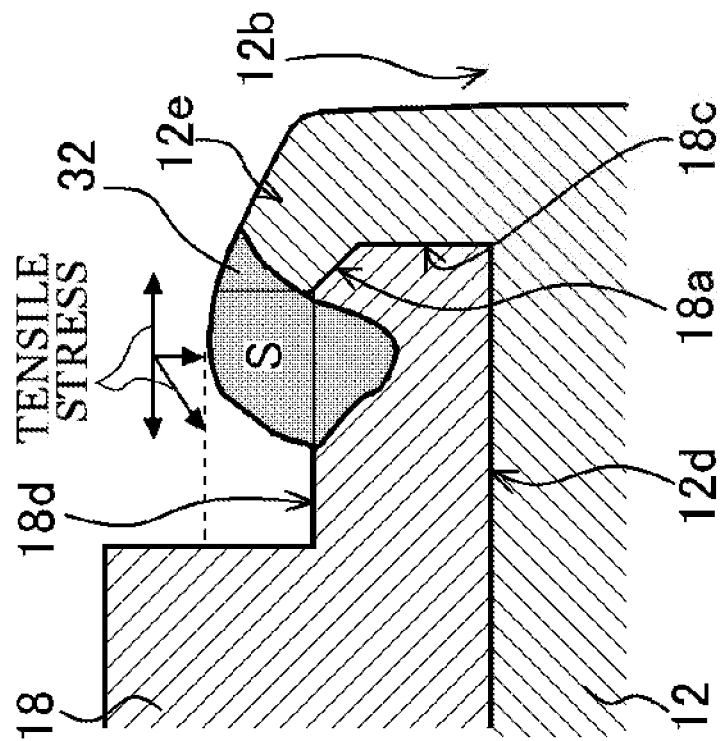
FIG. 8A is a partially enlarged view of a portion in a working example that corresponds to FIG. 6D.
Figure 8B:
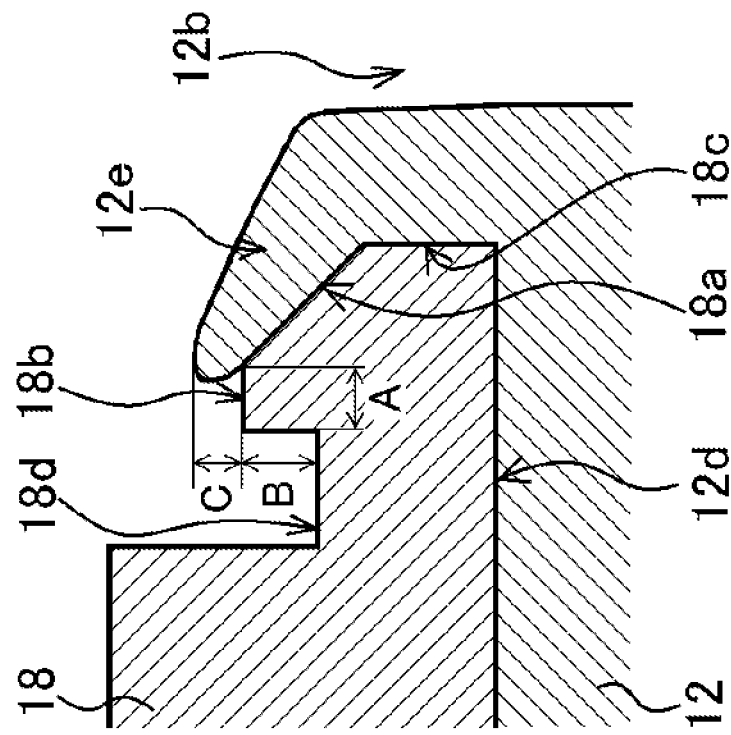
FIG. 8B is a partially enlarged cross-sectional view of a portion that identically corresponds to FIG. 6F.
Figure 9C:
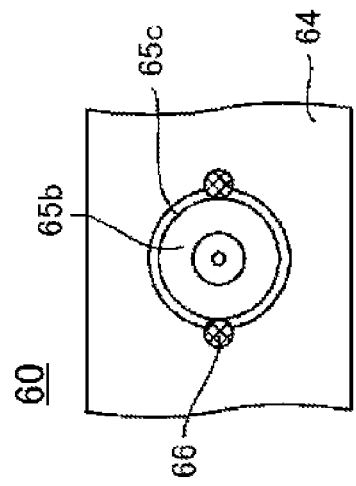
FIG. 9C is a plan view of FIG. 9B.
Figure 9D:
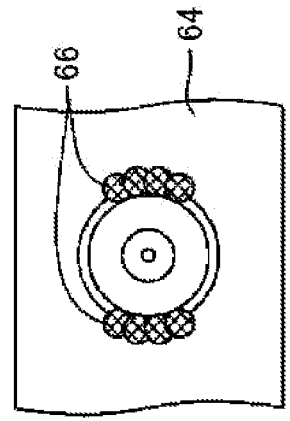
FIG. 9D is a plan view of after laser welding has been repeated a plurality of times so that a plurality of welded spots overlap with each other.
Figure 9A:
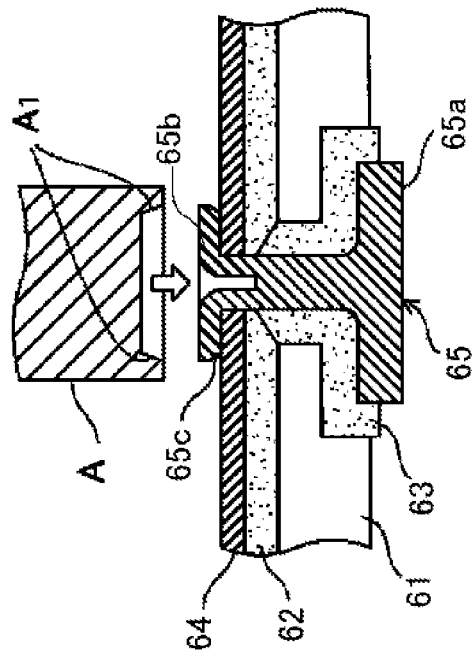
FIG. 9A is a cross-sectional view illustrating a step for processing a distal end of a crimping part of a terminal in a conventional example.
Figure 9B:
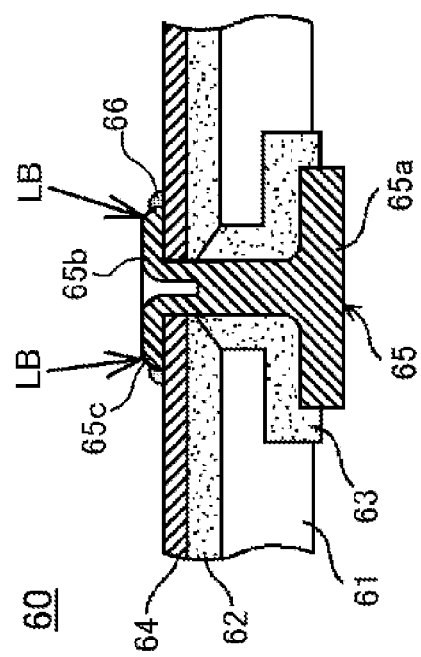
FIG. 9B is a drawing illustrating a step for laser-welding after the step in FIG. 9A.

In view whereof, in the positive electrode terminal plate 18 or negative electrode terminal plate 21 corresponding to the working example, the convexity 18b is given a ring shape by the formation of the groove 18d concentrically with respect to the through-hole 18c of the positive electrode terminal plate 18 on the outer peripheral side of the convexity 18b. FIG. 8A is a partially enlarged view of the working example that corresponds to FIG. 6D, and FIG. 8B is a partially enlarged cross-sectional view that identically corresponds to FIG. 6F.

In this state, when welding is carried out with laser light irradiation that is centered on the boundary between the distal end of the crimping part 12e of the positive electrode exterior terminal 12 and the convexity 18b of the positive electrode terminal plate 18, a similarity with the case of the comparative example arises in that the welding-melted parts are formed, but because of the presence of the groove 18d, the upper part of the welding-melted parts does not become level, and surface tension maintains the convex state. When the welding-melted parts cool and the welded spots 32 are formed, a tensile stress on the convexity 18b side is oriented obliquely downward to the outer peripheral side of the convexity 18b, i.e., to the side where the groove 18d is formed, as illustrated with the arrow in FIG. 8B, and thus is distributed not only in the transverse direction but also the vertical direction, wherefore cracking is less prone to take place in the welded spots 32.

Even though the distal ends of the crimping parts 12e, 14e of the positive electrode exterior terminal 12 and the negative electrode exterior terminal 14 corresponding to the working example may be of substantially the same height as the convexities 18b, 21b of the positive electrode terminal plate 18 and the negative electrode terminal plate 21, the tensile stress of when the welded spots 32, 33 are formed is still obliquely downward and is still distributed not only in the transverse direction but also the vertical direction, wherefore cracking is less prone to take place in the welded spots 32, 33. However, when the position of the distal ends of the crimping parts 12e, 14e of the positive electrode exterior terminal 12 and the negative electrode exterior terminal 14 is more upward than the convexities 18b, 21b of the positive electrode terminal plate 18 and the negative electrode terminal plate 21, as illustrated in FIG. 8A, the laterally directed component of the tensile stress is lessened and the vertically directed component thereof is increased, and thus cracking is even less prone to take place.

Because an aluminum-based metal has less mechanical strength than a copper-based metal, preferably, the welded spots 32 formed on the positive electrode side are in a state where all positions corresponding to the convexity 18b in the radial direction of the through-hole 18c of the positive electrode terminal plate 18 are fused, in order to enhance the coupling strength between the positive electrode exterior terminal 12 and the positive electrode terminal plate 18. Herein, the maximum cross-sectional area Smax of the position corresponding to the convexity 18b on the welded spots 32 is defined as follows. Namely, FIG. 8A corresponds to a vertical cross-sectional view passing through the center of the through-hole 18c; the cross-sectional area of the convexity 18b is equivalent to the cross-sectional area of a protruding region (trapezoidal region) above the bottom surface of the groove 18d. The maximum value of the cross-sectional area S of a portion formed when the convexity 18b is fused at each of the welded spots 32, as illustrated in FIG. 8B, is the maximum cross-sectional area Smax of the position corresponding to the convexity 18b. When the maximum cross-sectional area Smax is about 80% or more of the cross-sectional area of the convexity 18b, it becomes possible to endow a fuller coupling strength between the positive electrode exterior terminal 12 and the positive electrode terminal plate 18.

Even in a state where the entirety of the position corresponding to the convexity 18b in the radial direction of the through-hole 18c of the positive electrode terminal plate 18 is fused, the surface tension of the welding-melted part causes the surface not to be level, and also, because not all of the ring-shaped convexity 18b is fused, the convexity 18b will not become a level surface. The welded spots 33 (see FIG. 4A) formed on the negative electrode side have a high mechanical coupling strength due to the crimping between the negative electrode exterior terminal 14 and the negative electrode terminal plate 21, and thus may be smaller than the welded spots 32 on the positive electrode side.

[Confirmatory Testing]

Confirmatory testing was carried out to confirm the ratio of occurrence of cracking in the welded spots in the working example and the welded spots in the comparative example as described hereinabove. As testing conditions, the dimensions of each of the parts were set to be as per the indication provided in Table 1 below, so that the difference between the configurations of the positive electrode terminal plate and negative electrode terminal plate in the working example and the comparative example would be merely the presence or absence of the convexity (groove part). "A" indicates the width of a level portion of the convexity, "B" indicates the height of the convexity, and "C" indicates the height of the crimping part on the convexity. Because no convexity (groove part) is formed in the positive electrode terminal plate and negative electrode terminal plate of the comparative example, no numerical values for "A" and "B" are given.

TABLE 1

|  | Terminal plate | A (Convexity width) | B (Convexity height) | C (Crimp distal end height) |
| --- | --- | --- | --- | --- |
| Working example | Positive electrode side | 0.20 mm | 0.22 mm | About 0.2 mm |
|  | Negative electrode side | 0.10 mm | 0.18 mm | About 0.1 mm |
| Comparative example | Positive electrode side | — | — | About 0.2 mm |
|  | Negative electrode side | — | — | About 0.1 mm |

Positive electrode terminal plates and negative electrode terminal plates formed to the dimensions indicated in Table 1 were used and conditions were harmonized with respective optimal welding conditions for the positive electrode side and negative electrode side in the case of the working example to create 100 samples, each, for both the positive electrode side and the negative electrode side in both the working example and the comparative example; the question of whether or not cracking had taken place in the welded spots was measured by visual observation. The results are summarized in Table 2.

TABLE 2

|  | Terminal plate | Positive electrode side | Negative electrode side |
| --- | --- | --- | --- |
| Comparative example | No convexity | 13% | 100% |
| Working example | Convexity included | 0% | 0% |

According to the results indicated in Table 2, the positive electrode side showed no occurrence of cracking in the welded spots in the working example, but did show that cracking had been generated in 13% of the welded spots in the comparative example. By contrast, the negative electrode side showed no occurrence of cracking in the welded spots in the working example, but did show that cracking had been generated in all of the welded spots in the comparative example.

This difference in the ratio of occurrence of cracking in the welded spots of the working example and the comparative example is presumed to have taken place because of the following reason. Namely, in the working example, the fact that the groove side of the convexity formed in the positive electrode terminal plate and the negative electrode terminal plate, i.e., the outer edge of the convexity in the radial direction of the through-hole was opened gave rise to a state where the welding-melted parts formed by laser light irradiation had swollen in a convex manner. For this reason, the tensile stress applied to the welded spots when the welding-melted parts are solidified is distributed in the transverse direction and the longitudinal direction, and the transversely directed tensile stress is presumed to be relatively smaller. By contrast, in the comparative example, no groove is formed in the positive electrode terminal plate and negative electrode terminal plate, nor is a convexity present, and thus the welding-melted parts formed by laser light irradiation are substantially level, and the transversely directed tensile stress is applied without alteration to the welded spots when the welding-melted parts are solidified, and therefore, presumably, more cracking occurs in the welded spots.

Also, one reason for which cracking was formed in all of the welded spots on the negative electrode side of the comparative example is that the welding conditions that were optimal in the working example were applied in the comparative example, too, for laser-welding that fused the majority of the convexity, and thus there was a greater amount of energy used for welding. For this reason, in the comparative example where no groove was formed nor was a convexity present, there was too much energy used for welding, and therefore, presumably, cracking took place in all of the welded spots. This provides confirmation that the formation of cracking in the welded spots could be prevented when, on the negative electrode side of a separate comparative example, the welding energy is lowered and the diameter of the welded spots is reduced.

Because the negative electrode side is formed of a copper-based metal and therefore has a greater mechanical strength than does the positive electrode side formed of an aluminum-based metal, even when the diameter of the welded spots is reduced to be lower than on the positive electrode side, it is still possible to ensure a coupling strength equivalent to that of the positive electrode side, as a total coupling strength combining the coupling strength due to crimping and the coupling strength due to welding, and, depending on the case, it would be possible to ensure a coupling strength equivalent to that of the positive electrode side without even forming the welded spots. For this reason, according to the prismatic non-aqueous electrolyte secondary battery 10 of the working example, obtained is a prismatic non-aqueous electrolyte secondary battery 10 having high coupling strength between the exterior terminals and the terminal plates, curbed fluctuations in interior resistance, and enhanced reliability, on both the positive electrode side and the negative electrode side.

Additionally, the configuration of the positive electrode side described for the prismatic non-aqueous electrolyte secondary battery 10 in the working example described above can also be adopted as the configuration of the negative electrode side. However, in a case where the configuration provided with the electrical current breaker mechanism 28 described above is adopted for the negative electrode side, there is no need for the electrical current breaker mechanism to be adopted on the positive electrode side, and thus a configuration similar to that of the negative electrode side as is illustrated in FIG. 4 could be adopted.

In an assembled battery unit in which the plurality of prismatic batteries are assembled, one positive electrode terminal plate may be used as a bas bar for connecting the positive electrode exterior terminals of each batteries, while one negative electrode terminal plate may be used as a bas bar for connecting the negative electrode exterior terminals of each batteries.

What is claimed is:

1. A prismatic secondary battery, comprising:
a prismatic outer casing having an opening;
an electrode assembly having a positive electrode plate and a negative electrode plate, the electrode assembly being accommodated within the prismatic outer casing;
a sealing body for sealing the opening of the prismatic outer casing, the sealing body having an inner surface that faces toward inside of the prismatic outer casing, an outer surface that is the opposite side of the inner surface, a first through-hole penetrating from the inner surface to the outer surface, and a third through-hole penetrating from the inner surface to the outer surface;
a positive electrode collector disposed in a region of the inner surface side of the sealing body and electrically connected to the positive electrode plate;
a negative electrode collector disposed in a region of the inner surface side of the sealing body and electrically connected to the negative electrode plate;
a positive electrode exterior terminal inserted into the first through-hole and electrically insulated from the sealing body via a first insulating member;
a negative electrode exterior terminal inserted into the third through-hole and electrically insulated from the sealing body via a second insulating member;
a positive electrode terminal plate arranged on the positive electrode exterior terminal in a region of the outer surface side of the sealing body and electrically connected to the positive electrode collector; and
a negative electrode terminal plate arranged on the negative electrode exterior terminal in a region of the outer surface side of the sealing body and electrically connected to the negative electrode collector; wherein
the positive electrode terminal plate has a second through-hole into which an upper end part of the positive electrode exterior terminal is inserted;
the second through-hole has a first convexity formed on an edge of the upper end side of the second through-hole;
the upper end part of the positive electrode exterior terminal inserted into the second through-hole on the side where the first convexity is formed is crimped and connected to the positive electrode terminal plate, and straddling the positive electrode terminal plate, is fused with at least a part of the first convexity by irradiation with high-energy beams, and a first welded spot is formed; and
the positive electrode terminal plate is formed with a groove at an outer peripheral of the first convexity.

2. The prismatic secondary battery according to claim 1, wherein the positive electrode terminal plate is formed with a step at an outer peripheral of the first convexity, the step includes a side face extending into a vertical direction parallel to a central axis of the second through-hole and a top face extending from a top end of the side face to a horizontal direction perpendicular to the central axis of the second through-hole, and the height of the top face is higher than a distal end of the first welded spot.

3. The prismatic secondary battery according to claim 2, wherein the step, viewing from the above, is annular shape surrounding the second through-hole.

4. The prismatic secondary battery according to claim 1, wherein the second through-hole has a taper part at which diameter of the second through-hole gradually increases in upward direction.

5. The prismatic secondary battery according to claim 1, wherein the upper end part of the positive electrode exterior terminal on the side where the first convexity is formed protrudes above the first convexity.

6. The prismatic secondary battery according to claim 1, wherein the positive electrode exterior terminal has a brim part disposed between the positive electrode terminal plate and the sealing body.

7. A prismatic secondary battery, comprising:
a prismatic outer casing having an opening;
an electrode assembly having a positive electrode plate and a negative electrode plate, the electrode assembly being accommodated within the prismatic outer casing;
a sealing body for sealing the opening of the prismatic outer casing, the sealing body having an inner surface that faces toward inside of the prismatic outer casing, an outer surface that is the opposite side of the inner surface, a first through-hole penetrating from the inner surface to the outer surface;
a positive electrode collector disposed in a region of the inner surface side of the sealing body and electrically connected to the positive electrode plate;
a negative electrode collector disposed in a region of the inner surface side of the sealing body and electrically connected to the negative electrode plate;
a negative electrode exterior terminal inserted into the first through-hole and electrically insulated from the sealing body via an insulating member; and
a negative electrode terminal plate arranged on the negative electrode exterior terminal in a region of the outer surface side of the sealing body and electrically connected to the negative electrode collector; wherein
the negative electrode terminal plate has a second through-hole into which an upper end part of the negative electrode exterior terminal is inserted;
the second through-hole has a convexity formed on an edge of the upper end side of the second through-hole;
the upper end part of the negative electrode exterior terminal inserted into the second through-hole on a side where the convexity is formed is crimped and connected to the negative electrode terminal plate, and straddling the negative electrode terminal plate, is fused with at least a part of the convexity by irradiation with high-energy beams, and a welded spot is formed; and
the second through-hole has a taper part at which diameter of the second through-hole gradually increases in upward direction.

8. The prismatic secondary battery according to claim 7, wherein the negative electrode terminal plate is formed with a groove at an outer peripheral of the convexity.

9. The prismatic secondary battery according to claim 7, wherein the negative electrode terminal plate is formed with a step at an outer peripheral of the convexity, the step includes a side face extending into a vertical direction parallel to a central axis of the second through-hole and a top face extending from a top end of the side face to a horizontal direction perpendicular to the central axis of the second through-hole, and the height of the top face is higher than a distal end of the welded spot.

10. The prismatic secondary battery according to claim 9, wherein the step, viewing from the above, is annular shape surrounding the second through-hole.

11. The prismatic secondary battery according to claim 7, wherein the upper end part of the negative electrode exterior terminal on the side where the convexity is formed protrudes above the first convexity.

12. The prismatic secondary battery according to claim 7, wherein the negative electrode exterior terminal has a brim part disposed between the negative electrode terminal plate and the sealing body.

13. A prismatic secondary battery, comprising:
a prismatic outer casing having an opening;
an electrode assembly having a positive electrode plate and a negative electrode plate, the electrode assembly being accommodated within the prismatic outer casing;
a sealing body for sealing the opening of the prismatic outer casing, the sealing body having an inner surface that faces toward inside of the prismatic outer casing, an outer surface that is the opposite side of the inner surface, a first through-hole penetrating from the inner surface to the outer surface, and a third through-hole penetrating from the inner surface to the outer surface;
a positive electrode collector disposed in a region of the inner surface side of the sealing body and electrically connected to the positive electrode plate;
a negative electrode collector disposed in a region of the inner surface side of the sealing body and electrically connected to the negative electrode plate;
a positive electrode exterior terminal inserted into the first through-hole and electrically insulated from the sealing body via a first insulating member;
a negative electrode exterior terminal inserted into the third through-hole and electrically insulated from the sealing body via a second insulating member;
a positive electrode terminal plate arranged on the positive electrode exterior terminal in a region of the outer surface side of the sealing body and electrically connected to the positive electrode collector; and
a negative electrode terminal plate arranged on the negative electrode exterior terminal in a region of the outer surface side of the sealing body and electrically connected to the negative electrode collector; wherein
the positive electrode terminal plate has a second through-hole into which an upper end part of the positive electrode exterior terminal is inserted;
the second through-hole has a first convexity formed on an edge of the upper end side of the second through-hole;
the upper end part of the positive electrode exterior terminal inserted into the second through-hole on the side where the first convexity is formed is crimped and connected to the positive electrode terminal plate, and straddling the positive electrode terminal plate, is fused with at least a part of the first convexity by irradiation with high-energy beams, and a first welded spot is formed; and
the positive electrode terminal plate is formed with a step at an outer peripheral of the first convexity, the step includes a side face extending into a vertical direction parallel to a central axis of the second through-hole and a top face extending from a top end of the side face to a horizontal direction perpendicular to the central axis of the second through-hole, and the height of the top face is higher than a distal end of the first welded spot.

14. A prismatic secondary battery, comprising:
a prismatic outer casing having an opening;
an electrode assembly having a positive electrode plate and a negative electrode plate, the electrode assembly being accommodated within the prismatic outer casing;
a sealing body for sealing the opening of the prismatic outer casing, the sealing body having an inner surface that faces toward inside of the prismatic outer casing, an outer surface that is the opposite side of the inner surface, a first through-hole penetrating from the inner surface to the outer surface, and a third through-hole penetrating from the inner surface to the outer surface;
a positive electrode collector disposed in a region of the inner surface side of the sealing body and electrically connected to the positive electrode plate;
a negative electrode collector disposed in a region of the inner surface side of the sealing body and electrically connected to the negative electrode plate;
a positive electrode exterior terminal inserted into the first through-hole and electrically insulated from the sealing body via a first insulating member;
a negative electrode exterior terminal inserted into the third through-hole and electrically insulated from the sealing body via a second insulating member;
a positive electrode terminal plate arranged on the positive electrode exterior terminal in a region of the outer surface side of the sealing body and electrically connected to the positive electrode collector; and
a negative electrode terminal plate arranged on the negative electrode exterior terminal in a region of the outer surface side of the sealing body and electrically connected to the negative electrode collector; wherein
the positive electrode terminal plate has a second through-hole into which an upper end part of the positive electrode exterior terminal is inserted;
the second through-hole has a first convexity formed on an edge of the upper end side of the second through-hole;
the upper end part of the positive electrode exterior terminal inserted into the second through-hole on the side where the first convexity is formed is crimped and connected to the positive electrode terminal plate, and straddling the positive electrode terminal plate, is fused with at least a part of the first convexity by irradiation with high-energy beams, and a first welded spot is formed; and
the second through-hole has a taper part at which diameter of the second through-hole gradually increases in upward direction.

15. A prismatic secondary battery, comprising:
a prismatic outer casing having an opening;
an electrode assembly having a positive electrode plate and a negative electrode plate, the electrode assembly being accommodated within the prismatic outer casing;
a sealing body for sealing the opening of the prismatic outer casing, the sealing body having an inner surface that faces toward inside of the prismatic outer casing, an outer surface that is the opposite side of the inner surface, a first through-hole penetrating from the inner surface to the outer surface, and a third through-hole penetrating from the inner surface to the outer surface;
a positive electrode collector disposed in a region of the inner surface side of the sealing body and electrically connected to the positive electrode plate;
a negative electrode collector disposed in a region of the inner surface side of the sealing body and electrically connected to the negative electrode plate;
a positive electrode exterior terminal inserted into the first through-hole and electrically insulated from the sealing body via a first insulating member;
a negative electrode exterior terminal inserted into the third through-hole and electrically insulated from the sealing body via a second insulating member;

a positive electrode terminal plate arranged on the positive electrode exterior terminal in a region of the outer surface side of the sealing body and electrically connected to the positive electrode collector; and a negative electrode terminal plate arranged on the negative electrode exterior terminal in a region of the outer surface side of the sealing body and electrically connected to the negative electrode collector; wherein the positive electrode terminal plate has a second through-hole into which an upper end part of the positive electrode exterior terminal is inserted;

the second through-hole has a first convexity formed on an edge of the upper end side of the second through-hole;

the upper end part of the positive electrode exterior terminal inserted into the second through-hole on the side where the first convexity is formed is crimped and connected to the positive electrode terminal plate, and straddling the positive electrode terminal plate, is fused with at least a part of the first convexity by irradiation with high-energy beams, and a first welded spot is formed; and the positive electrode exterior terminal has a brim part disposed between the positive electrode terminal plate and the sealing body.

* * * * *